US012785395B2

(12) United States Patent
Inam

(10) Patent No.: US 12,785,395 B2
(45) Date of Patent: Nov. 3, 2026

(54) RESILIENT ON-SITE MICROGRID SYSTEM

(71) Applicant: DG Matrix, Inc., Raleigh, NC (US)

(72) Inventor: Haroon Inam, Raleigh, NC (US)

(73) Assignee: DG Matrix, Inc., Raleigh, NC (US)

( * ) Notice: Subject to any disclaimer, the term of this patent is extended or adjusted under 35 U.S.C. 154(b) by 0 days.

(21) Appl. No.: 18/944,924

(22) Filed: Nov. 12, 2024

(65) Prior Publication Data

US 2025/0079839 A1 Mar. 6, 2025

Related U.S. Application Data

(63) Continuation-in-part of application No. 18/940,267, filed on Nov. 7, 2024, now Pat. No. 12,489,359, which is a continuation-in-part of application No. 18/627,004, filed on Apr. 4, 2024.

(60) Provisional application No. 63/606,872, filed on Dec. 6, 2023, provisional application No. 63/458,805, filed on Apr. 12, 2023.

(51) Int. Cl.

| | |
|---|---|
| ***H02J 9/00*** | (2006.01) |
| ***H02J 3/0012*** | (2026.01) |
| ***H02J 3/007*** | (2026.01) |
| ***H02J 3/32*** | (2006.01) |
| ***H02J 3/38*** | (2006.01) |
| *H02J 101/24* | (2026.01) |

(52) U.S. Cl.
CPC .......... *H02J 3/0075* (2020.01); *H02J 3/0012* (2020.01); *H02J 3/32* (2013.01); *H02J 3/38* (2013.01); *H02J 2101/24* (2026.01)

(58) Field of Classification Search
CPC .......... H02J 3/0075; H02J 3/0012; H02J 3/32; H02J 3/38
See application file for complete search history.

(56) References Cited

U.S. PATENT DOCUMENTS

| | | | |
|---|---|---|---|
| 6,381,155 | B1 | 4/2002 | Kadatsky et al. |
| 8,154,887 | B2 | 4/2012 | Hinds et al. |
| RE43,572 | E | 8/2012 | West |
| 9,397,580 | B1 | 7/2016 | Alexander |

(Continued)

FOREIGN PATENT DOCUMENTS

| | | | |
|---|---|---|---|
| AU | 4899200 | A | 11/2000 |
| CN | 101320942 | A | 12/2008 |

(Continued)

OTHER PUBLICATIONS

Machine Translation CN-101320942-B (Year: 2008).

(Continued)

*Primary Examiner* — Ryan Johnson
*Assistant Examiner* — Esayas G Yeshaw
(74) *Attorney, Agent, or Firm* — Neo IP

(57) ABSTRACT

A resilient on-site microgrid system includes a multiport power router directly connected to various energy sources, including batteries, renewable energy sources, and broader grid power, as well as various loads, including electric vehicle chargers. The multiport power router dynamically adjusts power provided from the various power sources and to the various loads, especially to power devices in a nearby facility. The microgrid system includes various bypass systems allowing for powering of critical loads in the event of failure of individual components or pathways within the microgrid system.

20 Claims, 12 Drawing Sheets

(56) References Cited

U.S. PATENT DOCUMENTS

| | | | |
|---|---|---|---|
| 9,489,701 | B2 | 11/2016 | Emadi et al. |
| 9,645,596 | B1 | 5/2017 | Lee et al. |
| 9,647,568 | B1 | 5/2017 | Bundschuh et al. |
| 9,866,016 | B2 | 1/2018 | Terlizzi et al. |
| 9,871,379 | B2 | 1/2018 | Cheng et al. |
| 9,899,941 | B1 | 2/2018 | Wang et al. |
| 9,973,107 | B2 | 5/2018 | Cerqueira Pinto Bezerra Varajão et al. |
| 10,005,371 | B2 | 6/2018 | Reineccius et al. |
| 10,110,010 | B2 | 10/2018 | Lucas et al. |
| 10,135,251 | B2 | 11/2018 | Berard |
| 10,439,432 | B2 | 10/2019 | Eckhardt et al. |
| 10,522,306 | B2 | 12/2019 | White et al. |
| 10,608,545 | B2 | 3/2020 | Keister et al. |
| 10,734,914 | B2 | 8/2020 | Azidehak et al. |
| 10,756,546 | B2 | 8/2020 | Pmsvvsv et al. |
| 10,882,412 | B2 | 1/2021 | Mrlik et al. |
| 11,011,913 | B2 | 5/2021 | Smith et al. |
| 11,031,785 | B1 | 6/2021 | Erokhovets |
| 11,063,579 | B2 | 7/2021 | Beddingfield et al. |
| 11,108,235 | B1 | 8/2021 | Awal et al. |
| 11,196,338 | B2 | 12/2021 | Beddingfield et al. |
| 11,251,620 | B2 | 2/2022 | Cai et al. |
| 11,283,262 | B2 | 3/2022 | Arslan et al. |
| 11,399,065 | B1 | 7/2022 | Thirumurthy et al. |
| 11,491,883 | B2 | 11/2022 | Khaligh et al. |
| 11,509,128 | B2 | 11/2022 | Song et al. |
| 11,588,397 | B2 | 2/2023 | Zhu et al. |
| 11,715,973 | B2 | 8/2023 | Sok et al. |
| 11,807,123 | B1 | 11/2023 | Seroff et al. |
| 11,824,461 | B2 | 11/2023 | Bhattacharya et al. |
| 11,831,236 | B2 | 11/2023 | Dai et al. |
| 12,316,226 | B2 | 5/2025 | Suzuki et al. |
| 2004/0017110 | A1* | 1/2004 | Yim ........................ H02J 9/062 307/23 |
| 2004/0037274 | A1 | 2/2004 | Osawa et al. |
| 2005/0174090 | A1 | 8/2005 | Hayashi |
| 2005/0248964 | A1 | 11/2005 | Dalal |
| 2009/0018706 | A1 | 1/2009 | Wittner |
| 2011/0035070 | A1 | 2/2011 | Kanai |
| 2011/0204720 | A1 | 8/2011 | Ruiz et al. |
| 2012/0091811 | A1* | 4/2012 | Heidenreich ........ G01R 31/392 307/65 |
| 2012/0205982 | A1* | 8/2012 | Navarro .................. H02J 9/062 307/66 |
| 2013/0039105 | A1 | 2/2013 | Rozman et al. |
| 2013/0241291 | A1* | 9/2013 | Wang ........................ H02J 9/06 307/64 |
| 2014/0032147 | A1 | 1/2014 | Verhulst et al. |
| 2014/0268897 | A1 | 9/2014 | Zimmanck |
| 2015/0015071 | A1 | 1/2015 | Deboy et al. |
| 2015/0180350 | A1* | 6/2015 | Huang .............. H02M 3/33584 307/66 |
| 2015/0280594 | A1 | 10/2015 | Lin et al. |
| 2015/0357946 | A1 | 12/2015 | Farr et al. |
| 2015/0372604 | A1 | 12/2015 | Balakrishnan et al. |
| 2016/0137087 | A1 | 5/2016 | Haas et al. |
| 2017/0047771 | A1 | 2/2017 | Motsenbocker |
| 2017/0117913 | A1 | 4/2017 | Yamamoto et al. |
| 2017/0133879 | A1 | 5/2017 | Eckhardt et al. |
| 2017/0271915 | A1 | 9/2017 | Quinn et al. |
| 2017/0279376 | A1 | 9/2017 | Siri |
| 2018/0090987 | A1 | 3/2018 | Hashimoto |
| 2018/0198377 | A1 | 7/2018 | Keister et al. |
| 2018/0358839 | A1 | 12/2018 | Perez et al. |
| 2019/0312441 | A1 | 10/2019 | Ballantine et al. |
| 2020/0103453 | A1 | 4/2020 | Roxenborg et al. |
| 2020/0169252 | A1 | 5/2020 | Spaeth et al. |
| 2020/0186043 | A1 | 6/2020 | Park et al. |
| 2020/0259325 | A1* | 8/2020 | Li .......................... H02H 9/025 |
| 2020/0313539 | A1 | 10/2020 | Hall et al. |
| 2021/0012944 | A1 | 1/2021 | Beddingfield et al. |
| 2021/0351730 | A1 | 11/2021 | Markunas |
| 2021/0408937 | A1 | 12/2021 | Bhattacharya et al. |
| 2022/0037915 | A1 | 2/2022 | Pachoud et al. |
| 2022/0103858 | A1 | 3/2022 | Jang et al. |
| 2022/0140644 | A1 | 5/2022 | Dent |
| 2022/0161677 | A1 | 5/2022 | Pizzurro et al. |
| 2022/0199302 | A1 | 6/2022 | Beddingfield et al. |
| 2022/0206047 | A1 | 6/2022 | Curt et al. |
| 2022/0216728 | A1* | 7/2022 | Ashman ............ H02J 13/00002 |
| 2022/0321016 | A1 | 10/2022 | Khaligh et al. |
| 2022/0393505 | A1 | 12/2022 | Marzano et al. |
| 2022/0399722 | A1 | 12/2022 | Dennis et al. |
| 2022/0402390 | A1 | 12/2022 | Smolenaers |
| 2022/0416642 | A1 | 12/2022 | Satyanarayana et al. |
| 2023/0022784 | A1 | 1/2023 | Suzuki et al. |
| 2023/0033229 | A1 | 2/2023 | Wu et al. |
| 2023/0108060 | A1 | 4/2023 | Krishnamoorthy et al. |
| 2023/0170783 | A1 | 6/2023 | Tian et al. |
| 2023/0305077 | A1 | 9/2023 | Maley et al. |
| 2023/0314491 | A1 | 10/2023 | Kulkarni et al. |
| 2023/0318435 | A1 | 10/2023 | Yuan et al. |
| 2023/0327574 | A1 | 10/2023 | Hawes et al. |
| 2023/0387780 | A1 | 11/2023 | Zhuang et al. |
| 2023/0406126 | A1 | 12/2023 | Mauger et al. |
| 2024/0088776 | A1 | 3/2024 | Kadam et al. |
| 2024/0113526 | A1 | 4/2024 | Miranbeigi et al. |
| 2024/0120739 | A1 | 4/2024 | Miranbeigi et al. |
| 2024/0128764 | A1* | 4/2024 | Mitsugi ..................... H02J 3/38 |
| 2024/0356333 | A1 | 10/2024 | Kasicheyanula et al. |
| 2025/0079839 | A1* | 3/2025 | Inam ..................... H02J 3/0012 |
| 2025/0222793 | A1 | 7/2025 | Su et al. |
| 2025/0279730 | A1 | 9/2025 | Liu et al. |

FOREIGN PATENT DOCUMENTS

| | | | |
|---|---|---|---|
| CN | 106452136 | A | 2/2017 |
| EP | 3125392 | A1 | 2/2017 |
| KR | 102308764 | B1 | 10/2021 |
| WO | 2021090108 | A1 | 5/2021 |
| WO | 2021226104 | A1 | 11/2021 |
| WO | 2022046959 | A1 | 3/2022 |
| WO | 2022103858 | A1 | 5/2022 |
| WO | 2022173791 | A1 | 8/2022 |
| WO | 2022173800 | A1 | 8/2022 |
| WO | 2022216738 | A1 | 10/2022 |
| WO | 2023288248 | A2 | 1/2023 |

OTHER PUBLICATIONS

Neubert, M. (2020). "Modeling, synthesis and operation of multiport-active bridge converters" (Doctoral dissertation, Dissertation, Rheinisch-Westfalische Technische Hochschule Aachen, 2020 (Year: 2020).

Tao, H., Kotsopoulos, A., Duarte, J. L., & Hendrix, M.A. (2006). Family of multiport bidirectional DC-DC converters. IEE Proceedings—Electric Power Applications, 153(3), 451-458. (Year: 2006).

Chattopadhyay, Ritwik, Three Port Transformer Isolated Phase Shifted DC-DC Converter Design & Control for Renewable Energy Source and Energy Storage Integration, NC State Dissertation published Aug. 16, 2018.

Kado, Y., D. Shichijo, K. Wada, and K. Iwatsuki (2016), Multiport power router and its impact on future smart grids, Radio Sci., 51, 1234-1246, doi:10.1002/2016RS006041.

Krishnaswami, Hariharan, Three-port DC-DC Converters to Interface Renewable Energy Sources with Bi-directional Load and Energy, University of Minnesota Dissertation published Aug. 2009.

M. La Mendola et al., "Four-Port Bidirectional Dual Active Bridge Converter for EVs Fast Charging," Roma Tre University, published 2019.

M. Rashidi, N. N. Altin, S. S. Ozdemir, A. Bani-Ahmed and A. Nasiri, "Design and Development of a High-Frequency Multiport Solid-State Transformer With Decoupled Control Scheme," in IEEE Transactions on Industry Applications, vol. 55, No. 6, pp. 7515-7526, Nov.-Dec. 2019, doi: 10.1109/TIA.2019.2939741.

Mohamed A. Elkeiy et al., "Multiport DC-DC Converter with Differential Power Processing for Fast EV Charging Stations," MDPI, published Feb. 7, 2023.

Shah, Suyash Sushilkumar et al., Optimized AC/DC Dual Active Bridge Converter using Monolithic SiC Bidirectional FET (BiDFET)

(56) References Cited

OTHER PUBLICATIONS for Solar PV Applications, published in 2021 IEEE Energy Conversion Congress and Exposition (ECCE), Oct. 2021, doi: 10.1109/ECCE47101.2021.9595533.
Shakil Ahamed Khan et al., "A New Isolated Multi-Port Converter with Multi-Directional Power Flow Capabilities for Smart Electric Vehicle Charging Stations," IEEE Transactions on Applied Superconductivity, published Jan. 27, 2019.
Subhashish Bhattacharya, "Monolithic SiC-based Bidirectional FET (BiDFET): Vehicle Electrification Opportunities," APEC, published Mar. 23, 2022.
Vishnu Mahadeva Iyer et al., "Extreme Fast Charging Station Architecture for Electric Vehicles with Partial Power Processing," North Carolina State University, published Mar. 4, 2018.
International Search Report and Written Opinion dated Feb. 27, 2026 issued by the International Application Division, Korean Intellectual Property Office as International Searching Authority in connection with International Application No. PCT/US2025/053739 (10 pages).

* cited by examiner

Prior Art FIG. 13

RESILIENT ON-SITE MICROGRID SYSTEM

CROSS-REFERENCE TO RELATED APPLICATIONS

This application is related to and claims priority from the following US patents and patent applications: this application is a continuation-in-part of U.S. patent application Ser. No. 18/627,004, filed Apr. 4, 2024, which claims priority from and the benefit of U.S. Provisional Patent Application No. 63/458,805, filed Apr. 12, 2023. This application is also a continuation-in-part of U.S. patent application Ser. No. 18/940,267, filed Nov. 7, 2024, which claims priority from and the benefit of U.S. Provisional Patent Application No. 63/606,872, filed Dec. 6, 2023. Each of the above-mentioned applications is incorporated herein by reference in its entirety.

BACKGROUND OF THE INVENTION

1. Field of the Invention

The present invention relates to microgrid systems, and more specifically to microgrids with simplified connection of multiple power sources, with bypasses for improved resilience.

2. Description of the Prior Art

It is generally known in the prior art to provide microgrid systems able to operate in both grid-connected and islanding modes.

Prior art patent documents include the following:

U.S. Patent Publication No. 20210408937 for MMC submodules scale-up methodology for mv and hv power conversion system applications by inventors Bhattacharya, et al., filed Jun. 24, 2021 and published Dec. 30, 2021, is directed to modular multilevel converter (MMC) scale-up control methodologies which can be applied for MV and HV DC applications. In one example, an MMC includes first and second legs each with submodule (SM) groups connected in series, where each SM group includes a plurality of SMs; local group controllers that can control a corresponding SM group; and a central controller that can control output voltage of the MMC via the local group controllers. The local group controllers can provide capacitor voltage balancing (CVB) control of corresponding SM groups.

WIPO Publication No. 2022103858 for Multiport energy routing systems by inventors Mauger, et al., filed Nov. 10, 2021 and published May 19, 2022, is directed to a flexible multiport energy routing system including a first port configured to connect to an AC grid, a plurality of second ports configured to connect to a plurality of devices, a step-down transformer, a power converter stack, and a third port. The step-down transformer can have a high voltage side electrically coupled to the first port and a low voltage side. The power converter stack can comprise a plurality of power converter modules each having a first converter bridge connected to the low voltage side of the step-down transformer and a second converter bridge connected to one or more of the plurality of second ports. Each of the power converter modules can have a converter transformer connected between the first and second converter bridges. The first and second converter bridges can bidirectionally manage AC and DC power flows between the first, second, and third ports.

U.S. Pat. No. 11,196,338 for Semiconductor topologies and devices for soft starting and active fault protection of power converters by inventors Beddingfield, et al., filed Dec. 29, 2018 and issued Dec. 7, 2021, is directed to semiconductor topologies and devices that can be used for soft starting and active fault protection of power converters. In one example, an active switch device includes an active switch having a gating control input; and a thyristor having a gating control input. The thyristor is coupled in parallel with the active switch. The active switch can be an IGBT, MOSFET, or other appropriate device. In another example, a power converter can include the active switch devices and switching control circuitry coupled to gating control inputs of the active switch devices.

U.S. Patent Publication No. 20210012944 for Transformer designs for very high isolation with high coupling by inventors Beddingfield, et al., filed Jul. 8, 2020 and published Jan. 14, 2021, is directed to transformer designs that offer very high isolation while maintaining high coupling between the windings. In one example, an isolation transformer includes a first excitation coil wound around a first core and a second excitation coil wound about a second core. The second core is electrically separated from the first core by a high resistivity magnetic material or a non-conductive material. The first and second cores can include corresponding core segments arranged in a trident geometry or a quindent geometry. The core segments can align when the first excitation coil is inserted into a void of the second excitation coil. The isolation transformer designs are mechanically separable which can result in safe, energized, plug operations.

U.S. Pat. No. 10,734,914 for Fault-tolerant controller for modular multi-level converters by inventors Azidehak, et al., filed Sep. 26, 2019 and issued Aug. 4, 2020, is directed to fault-tolerant controller architectures for multi-level converters. In one example, a multi-level converter includes an array of power modules. The power modules can include a controller communicatively coupled to controllers of adjacent power modules in the array of power modules. Circuitry of the controllers can receive operational data from the adjacent power modules; identify a fault condition in an adjacent power module using the operational data; and initiate reconfiguration of the array of power modules in response to an indication of the fault condition, where the reconfiguration bypasses the adjacent power module. In another example, a method includes identifying a fault condition in an adjacent power module in an array of power modules based upon operational data from one or more adjacent power modules of the array; and initiating reconfiguration of the array of power modules in response to an indication of the fault condition.

U.S. Patent Publication No. 20220199302 for Transformer and Method of Engineering a Transformer to Incorporate a Leakage Inductance by inventors Beddingfield, et al., filed Apr. 20, 2020 and published Jun. 23, 2022, is directed to a transformer including a core formed of at least one MANC alloy. The MANC alloy has a predefined permeability.

U.S. Pat. No. 11,063,579 for Circuit for providing variable waveform excitation by inventors Beddingfield, et al., filed Nov. 8, 2018 and issued Jul. 13, 2021, is directed to a circuit for testing an electronic component, such as a transformer, including at least two power supplies and at least two H bridge circuits. A first H bridge circuit is conductively coupled in parallel to a first power supply. A second H bridge circuit is conductively coupled in parallel to a second power supply. The second H bridge circuit includes one or more anti-series diodes for preventing current from the first power supply from passing through the second H bridge circuit to the second power supply. The first H bridge circuit and the second H bridge circuit are configured to conductively couple to the electronic component for providing a voltage with a predefined waveform to the electronic component.

U.S. Pat. No. 10,522,306 for System and method of causing a zero-current crossing in an electrical circuit by inventors White, et al., filed May 26, 2017 and issued Dec. 31, 2019, is directed to methods and systems for causing a zero-current crossing in an electrical circuit. The circuit can be a DC circuit in which case a switch is caused to open at or nearly at the zero crossing. Alternatively, the circuit can be an AC circuit.

WIPO Publication No. 2022216738 for Modular multi-port AC battery power converter systems and methods of using same by inventors Mauger, et al., filed Apr. 5, 2022 and published Oct. 13, 2022, is directed to a power conversion system including a first battery module, a second battery module, first and second transformers, and first, second, and third current source converter bridges. The transformers can have low voltage sides and high voltage sides. The first bridge can be configured to connect the battery modules and the low voltage sides of the transformers. A mid-point of the serial connection of the battery modules can be connected to a mid-point of the series connection of the transformers. The second bridge can connect to the high voltage side of the first transformer and one or more ports configured to transmit electrical power to and/or receive electrical power from an electrical load and/or source. The third bridge can be configured to connect to the high voltage side of the second transformer and the one and one or more ports.

WIPO Publication No. 2022173791 for Unified control strategies for grid-connected converters by inventors Miranbeigi, et al., filed Feb. 9, 2022 and published Aug. 18, 2022, is directed to a universal control (UniCon) scheme for grid-connected converters that allows operation automatically in grid-following, grid-firming, and grid-forming modes. The converter does not need information on the grid or connected sources and loads. The converter can set its own operating point based on local measurements. The converter can operate over a wide range of typically encountered steady-state, transient, and fault conditions. UniCon realizes a universal control strategy for converters on the grid, allowing operation in distinct modes, including dispatch in grid connected mode, and automatic load sharing in islanded or microgrid mode. Under transient conditions, the converters provide inertial support and improve damping to stabilize and reduce disturbances. Multiple converters on the system do not require detailed system knowledge or low-latency communications for fast coordination, using communications when available for slow coordination and system level optimization.

WIPO Publication No. 2023288248 for Soft switching solid state transformers implementing voltage stress mitigation techniques by inventors Zheng, et al., filed Jul. 13, 2022 and published Jan. 19, 2023, is directed to a soft-switching solid-state power transformer including a transformer, first and second auxiliary resonant circuits, first and second current-source inverter (CSI) bridges, and a first transformer capacitor. The first auxiliary resonant circuit can be coupled to a first winding connection of the transformer. The first auxiliary resonant circuit can comprise a resonant capacitor coupled across the first winding connection, and a resonant inductor coupled across the first winding connection in parallel with the resonant capacitor. The first CSI bridge can be coupled to the first auxiliary resonant circuit. The second auxiliary resonant circuit can be coupled to the second winding connection of the transformer. The second CSI bridge can be coupled to the second auxiliary resonant circuit. The first transformer capacitor can be coupled to a high voltage side of the first winding connection and a ground.

WIPO Publication No. 2022046959 for Energy meters and energy monitoring systems and methods by inventors Kulkarni, et al., filed Aug. 26, 2021 and published Mar. 3, 2022, is directed to an energy meter including a current sensor and an interchangeable voltage sensor. The current sensor can be configured to measure an electrical current flowing through a conductor. The interchangeable voltage sensor detachably can be connected to the current sensor and configured to measure an electrical voltage carried by the conductor.

WIPO Publication No. 2022173800 for Power converters utilizing deep learning neural networks and methods of use by inventors Miranbeigi, et al., filed Feb. 9, 2022 and published Aug. 18, 2022, is directed to a power converter system comprising a power converter. The power converter system can include a power converter electrically connected to a local power supply and an electrical utility grid. The power converter can include an output configured to exchange electrical power with the electrical utility grid. The power converter can be further configured to monitor one or more electrical parameters of the electrical utility grid over a period of time and alter one or more electrical parameters of the output of the power converter based on the monitored one or more electrical parameters of the electrical utility grid in real time using a deep learning neural network.

U.S. Patent No. RE43572 for Bi-directional multi-port inverter with high frequency link transformer by inventor West, filed Aug. 16, 2010 and issued Aug. 14, 2012, discloses a multi-port power converter where all ports are coupled through different windings of a high frequency transformer. Two or more, and typically all, ports have synchronized switching elements to allow the use of a high frequency transformer. This concept and type of converter is known. This invention mitigates a number of limitations in the present art and adds new capabilities that will allow applications to be served that would otherwise not have been practical. A novel circuit topology for a four-quadrant AC port is disclosed. A novel circuit topology for a unidirectional DC port with voltage boost capabilities is disclosed. A novel circuit topology for a unidirectional DC port with voltage buck capabilities is disclosed. A novel circuit for a high efficiency, high frequency, bi-directional, AC semiconductor switch is also disclosed.

U.S. Pat. No. 10,608,545 for Power management utilizing synchronous common coupling by inventors Keister et al., filed Mar. 8, 2018 and issued Mar. 31, 2020, discloses apparatuses, systems, and methods for managing power utilizing synchronous common coupling. An apparatus comprises a synchronous common coupling, a plurality of ports, and a plurality of stacks connected through the synchronous common coupling. Each stack comprises at least one stage, with each stage comprising at least one source/load bridge, at least one flux bridge, and a DC bus. The at least one source/load bridge of one stage of each stack is connected to a source or load through one of the plurality of ports, the at least one flux bridge of each stage is connected to an electrically isolated winding in the synchronous common coupling, and the at least one flux bridge of each stage is connected to the at least one source/load bridge of the stage through the DC bus. The synchronous common coupling is configured to exchange power between each of the plurality of stacks.

U.S. Pat. No. 11,491,883 for Vehicle on-board charger for bi-directional charging of low/high voltage batteries by inventors Khaligh et al., filed Apr. 10, 2019 and issued Nov. 8, 2022, discloses a compact light-weight on-board three-port power electronic system built in various configurations of triple-active-bridge-derived topologies, including modular implementations, with control strategies capable of bi-directional power transfer among the three ports of the power electronic system, including simultaneous charging of a high voltage (HV) battery and a low voltage (LV) battery from a single phase power grid or a three-phase power grid with minimized reactive power and active circulating current, with ensured soft-switching for MOSFET devices, and with enhanced synchronous rectification and reduced power losses.

U.S. Pat. No. 9,866,016 for Multiport power converter with load detection capabilities by inventors Terlizzi et al., filed Jul. 7, 2015 and issued Jan. 9, 2018, discloses power converters that convert alternating current (AC) power to direct current (DC) power. A power converter may have multiple ports. Each port may have an associated connector with multiple power and data terminals. When an electronic device is connected to a given port, the electronic device draws DC power from the power converter. To ensure that the capacity of the power converter is not exceeded when multiple devices are connected to the ports of the power converter, the power converter may actively monitor its ports for active loads. Load detection circuitry can determine what number of ports are active. Control circuitry can compute a per-port available DC power level based on the number of active ports and can provide this information to connected devices.

U.S. Pat. No. 10,439,432 for Highly flexible, electrical distribution grid edge energy manager and router by inventors Eckhardt et al., filed Mar. 27, 2015 and issued Oct. 8, 2019, discloses an electrical distribution grid energy management and router device, or GER device, installed in a distribution grid, and route power from power supply to one or more power consumers. The GER devices described herein may provide platforms to add one or more features to a distribution transformer, provide additional features and benefits to both the utility company and end consumer, and may serve as a platform for providing other features. A GER device may include sensors to measure electrical properties of incoming and outgoing power, and may include an electrical circuit layer having a central DC power stage. A GER device may include a physical layer providing a communications platform for one or more communication devices that may communicate with other GER devices to form a micro-grid, a utility, power consumers, third parties, and other electrical devices.

U.S. Pat. No. 9,871,379 for Smart microgrids and dual-output off-grid power inverters with DC source flexibility by inventors Cheng et al., filed Feb. 18, 2015 and issued Jan. 16, 2018, discloses a method and apparatus relating to smart microgrids supported by dual-output off-grid power inverters with DC source flexibility that can (1) intelligently and selectively pull power from one or multiple DC sources including solar panels, wind generators, and batteries based on certain criteria; (2) invert DC power to AC power; (3) supply the AC power to two off-grid circuits individually to power various types of AC loads that require different AC voltages, power quality, and power levels; (4) supply DC power through one or multiple DC output ports to power DC loads; and (5) charge batteries. Two or multiple dual-output off-grid power inverters can daisy-chain to form a group to support a larger microgrid which is ideal for off-grid AC Level 1 and Level 2 EV charging.

U.S. Pat. No. 11,031,785 for Device and method for intelligent control of power supply source connection by inventor Erokhovets, filed May 20, 2019 and issued Jul. 1, 2021, discloses providing continuous power supply to consumers at a minimal cost. The present device combines electrical power from a plurality of direct and alternating current sources while working together with or separately from an external electrical power grid. Inside of the device, generation sources are connected via DC/DC and AC/DC converters to a DC bus, to which batteries are also connected via a charge control system. DC current is converted into AC current through reversible AC/DC converters according to the number of grid phases and an AC bus is connected to said converters, allowing for energy from an external grid to also be used for charging the batteries. The method of control is based on a cyclical program for selecting energy sources, said program being executed by a control unit and having dynamic parameter correction that takes into account present and projected energy production and consumption.

U.S. Patent Pub. No. 2023/0108060 for System and method for providing uninterruptible power supply using one or more energy sources by inventors Krishnamoorthy et al., filed Oct. 6, 2022 and published Apr. 6, 2023, discloses a method and system of providing a power supply to a load using a micro-grid and an electrical grid without interrupting a power supply to the load during a power failure and restoration of the electrical grid. A non-grid AC sine wave is synchronized to a grid AC sine wave at the AC to AC synchronization circuit when the electrical grid power supply is restored, without turning OFF the DC to the AC inverter by performing synchronization of the non-grid AC sinewave to match the grid AC sine wave over a number of cycles to make the non-grid AC sine wave compatible with the grid power supply while the power supply generated from the non-grid sources remains uninterrupted and the voltage is in the predetermined threshold range for providing to the load.

U.S. Pat. No. 11,108,235 for Double synchronous unified virtual oscillator control for grid-forming and grid-following power electronic converters by inventors Awal et al., filed Feb. 11, 2021 and issued Aug. 31, 2021, discloses a power electronic converter utilizing exemplary double synchronous unified virtual oscillator control (DSUVOC) logic or circuitry to convert direct current to alternating current that is input into a power grid. An exemplary DSUVOC controller of the present disclosure includes a double synchronous space vector oscillator component, a sequence extraction component, a fault detection component, a pre-synchronization component, a virtual impedance component, a terminal voltage compensation component, and/or an active damping component, wherein the double synchronous unified virtual oscillator controller is capable of controlling a grid following or a grid forming power electronic converter enabling synchronization and fault ride-through under both balanced and unbalanced conditions.

U.S. Pat. No. 9,647,568 for Bi-directional multi-port applications by inventors Bundschuh et al., filed Feb. 17, 2014 and issued May 9, 2017, discloses methods and systems for bi-directional multi-port power conversion systems and applications. In some sample embodiments, current-modulating power converters can be used to provide conversion between synchronous and asynchronous power. In some sample embodiments, current-modulating power converters can perform power conversion can be performed to and from three-phase AC with an active neutral line. In some sample embodiments, current-modulating power converters can convert between synchronous and asynchronous power and also support three-phase AC with active neutral.

Chinese Patent No. 106452136 for A kind of multiport converters for energy internet, filed Jun. 20, 2016 and issued Apr. 2, 2019, discloses a kind of multiport converter for energy internet, belong to converters technical field. Converter of the invention is made of a static synchronous series compensator, a static synchronous compensator, a DC-DC converter and a three-phase DC-AC inverter. Static synchronous series compensator and static synchronous compensator are all based on Modular multilevel converter and constitute; DC-DC converter be by multiple isolation type DC-DC converters carry out input series connection, output-parallel and constitute, and with static synchronous series compensator and static synchronous compensator common high voltage DC bus. Converter of the invention integrates the function of THE UPFC and electric power electric transformer, has complementary advantages, and cost reduces; Using modular structure, be easy to extend and be arranged it is spare, it is with important application prospects in future source of energy internet.

The presentation "Monolithic SiC-based Bidirectional FET (BiDFET): Vehicle Electrification Opportunities" by author Bhattacharya, presented in March 2022, which discloses a Four Quadrant Switch (FQS), the characterization of SiC BiDFET, applications of BiDFET for vehicle electrification, and experimental results of a SiC BiDFET enabled grid-connected PV converter.

The article "Multiport DC-DC Converter with Differential Power Processing for Fast EV Charging Stations" by authors Elkeiy et al., published in February 2023, describes that, with the growing interest in owning electric vehicles due to increased environmental awareness and uncertain energy security together with the development of Li-ion batteries, quietness, and trouble-free operation, it is urgent to develop charging stations that are fast enough to supply the vehicles with energy conveniently, as in case of conventional petrol stations. The main reason that hinders the spread of fast charging stations is the installation cost, comprising the infrastructure and converter costs. In this article, a multiport DC-DC converter with differential power processing stages is proposed for Electric Vehicle (EV) fast charging stations, which results in a considerable reduction in the cost of using converters while achieving high efficiency. The proposed topology consists of two paths for the power flow (outer and inner loops) for EV battery charging with main and auxiliary DC-DC converters in the outer loop; all the ports are connected in series with the main supply, where the bulk power is being transferred. The main DC-DC converter injects a series voltage to control the power in the outer loop. The auxiliary DC-DC converters are rated at a fractional power that controls the partial power supplied to each port through the inner loops. Thanks to the fractional power processed by the auxiliary converter with the remaining power fed to the battery through the main converter, the proposed architecture enables simultaneous charging of multiple electric vehicles with better efficiency, lower cost, and the capability of providing a fault tolerance feature. A PWM control scheme for the converters to achieve bidirectional power flow in the partially rated DC-DC converters is discussed for the proposed system. Moreover, a practical down-scaled hardware prototype is designed to validate the functionality, control scheme, and effectiveness of the proposed topology in different case studies being investigated. The efficiency of the proposed converter is compared to the conventional configuration.

The article "Extreme fast charging station architecture for electric vehicles with partial power processing" by authors lyer et al., published in March 2018, describes a power delivery architecture for an Extreme Fast Charging (XFC) station that is meant to simultaneously charge multiple electric vehicles (EVs) with a 300-mile range battery pack in about 15 minutes. The proposed approach can considerably improve overall system efficiency as it eliminates redundant power conversion by making use of partial power rated dc-dc converters to charge the individual EVs as opposed to a traditional fast charging station structure based on full rated dedicated charging converters. Partial power processing enables independent charging control over each EV, while processing only a fraction of the total battery charging power. Energy storage(ES) and renewable energy systems such as photovoltaic (PV) arrays can be easily incorporated in the versatile XFC station architecture to minimize the grid impacts due to multi-mega watt charging. A control strategy is discussed for the proposed XFC station. Experimental results from a scaled down laboratory prototype are provided to validate the functionality, feasibility and cost-effectiveness of the proposed XFC station power architecture.

The article "A New Isolated Multi-Port Converter with Multi-Directional Power Flow Capabilities for Smart Electric Vehicle Charging Stations" by authors Khan et al., published on Jan. 28, 2019, describes that if the batteries are charged by clean renewable energy sources, electric vehicles (EVs) can have zero gas emission, contributing greatly toward the preservation of the green environment. In a smart micro-grid, EVs together with other distributed energy storage units can be used to supply electricity to the loads during the peak hours so as to minimize the effects of the load shedding and improve the quality of electricity. To achieve these goals, an isolated hybrid multi-port converter is required to control the power flows and balance the energy among renewable energy sources, EVs, and the grid. In this paper, a new isolated multi-port converter is proposed, which can control the power flow in multiple directions. The converter is modeled in the matlab/Simulink software environment and this validates the technology with a laboratory prototype test platform. The modeling, implementation, and results are discussed comprehensively.

The article "Four-Port Bidirectional Dual Active Bridge Converter for EVs Fast Charging" by authors La Mendola et al., published in 2019, describes the modeling of the isolated multiport bidirectional dual active bridge DC-DC Converter to be used in fast charging applications. The proposed topology uses four different full-bridge sections: the first full-bridge is able to manage the PV source, the second full-bridge is connected to a stationary storage system and can operate as either a source or a load, the remaining two full-bridges are able to manage the charging of the battery units up to two vehicles. All ports are connected through a high-frequency multi-winding transformer which allows to create a magnetic node. The analytical model of the four-port bidirectional dual active bridge DC-DC (4P-DAB) Converter is addressed in order to investigate the system behavior and to obtain the control law to manage the power flows between the ports. Switching model of a 100 kVA 4P-DAB Converter has been created in MATLAB/Simulink to validate the analytical model. The modes of operation of the proposed topology is then validated through the Hardware-In-the-Loop (HIL) test bench.

U.S. Pat. No. 9,645,596 for Method and apparatus for facilitating the operation of an on-site energy storage system to co-optimize battery dispatch by inventors Lee et al., filed Nov. 23, 2016 and issued May 9, 2017, discloses facilitating the operation and control of a fleet of on-site energy assets and optimizing energy dispatch across the fleet, thereby facilitating the use of the on-site energy assets instead of grid-supplied electric consumption. An example system may comprise a central platform and a plurality of on-site gateway devices configured to perform on-site asset control. An example method may comprise receiving a service availability call, performing fleet-level optimization, generating a set of site-level schedules, and causing, as a function of the site-level schedules, real-time on-site asset control. Other embodiments provide for determining a location of each grid-connected energy consumer at which to reduce grid-supplied energy consumption, determining an amount of a reduction of grid-supplied energy consumption, and transmitting a signal to each corresponding gateway device located at the determined location, the signal comprising data indicative of instructions for performing on-site energy dispatch.

U.S. Pat. No. 11,011,913 for Multifunction power management system by inventors Smith et al., filed Jan. 25, 2019 and issued May 18, 2021, discloses a dwelling power management system including a smart power integrated node located at a dwelling and configured to transit information to and receive information from a remote server arrangement. The smart power integrated node selectively controls power applied to dwelling electrical power hardware components according to a recommended operating procedure (ROP). The system also includes a utility switch connected to the smart power integrated node, the utility switch configured to control distribution of electrical power received from a dwelling external power source. The smart power integrated node transmits dwelling power usage information and dwelling user preferences to the remote server arrangement that evaluates relevant information including dwelling power usage information and dwelling user preferences and dwelling external factors to develop an optimized ROP. The smart power integrated node operates according to the optimized ROP.

US Patent No. 2018/0358839 for Multi-Function Energy Station by inventors Perez et al., filed May 31, 2018 and published Dec. 13, 2018, discloses an electrical power distribution network able to provide power to a plurality of loads, such as electric vehicle charging stations, on demand. The network includes a DC bus and a plurality of power sources that may be a number of renewable energy power sources, such as an array of photovoltaic (PV) cells and wind turbines, and a number of energy storage devices, such as batteries, that are electrically coupled to the DC bus. The network also includes a DC-to-AC power conversion system (PCS) that is electrically coupled to the DC bus and an AC utility feed line that is part of an electrical grid. The network further includes a system controller that controls which of the power sources and the utility grid provides power to the loads in response to a power demand from the loads and the available power from the power sources and the grid.

U.S. Pat. No. 11,807,123 for Resilient charging station by inventors Seroff et al., filed Dec. 20, 2022 and issued Nov. 7, 2023, discloses, in order to ensure continued charging of electric vehicles when a charging station is not currently received an input power from an external power source, systems and methods providing for operation of the charging station in a resilient operating mode in which an operating current is derived from a charge previously stored in a battery of the charging station. The operating current is produced by a resilient power subsystem within the charging station using the stored charge and is provided by the resilient power subsystem to one or more system components within the charging station in order to enable continued operation of the charging station, including enabling continuing vehicle charging during a time interval in which the charging station is not receiving input power from an external power source.

U.S. Pat. No. 10,756,546 for Methods of advanced grid and microgrid support functionalities through hybrid fuel cell systems by inventors Pmsvvsv et al., filed Aug. 9, 2018 and issued Aug. 25, 2020, discloses a method of controlling an inverter having a three phase output and a plurality of single phase loads connected to respective one of the three phases of the three phase output includes determining if a first phase of the three phase output has a heavier load than a second phase of the three phase output, and providing a higher output power from the inverter to the first phase than to the second phase if it is determined that the first phase has a heavier load than the second phase.

U.S. Pat. No. 10,882,412 for Devices, systems, and related methods for power conversion and management by inventors Mrlik et al., filed Nov. 27, 2018 and issued Jan. 5, 2021, discloses a modular, integrated charging system and method for fast charging of a battery of an electric vehicle (EV) include an under-ground stationary battery storage system and an above-ground charging station, which is operatively connected to an AC grid and a solar panel. The EV's battery may be charged using little or no grid capacity by prioritizing and managing power production and use based on loading and pricing in real time.

US Patent No. 2022/0399722 for Devices, systems, and related methods for power conversion and management by inventors Dennis et al., filed Jun. 2, 2022 and published Dec. 15, 2022, discloses a power system connectable to an electric utility grid including a local bus connected to at least one non-grid source of electrical energy; an electrical connection between the local bus and an electric utility grid; and a unidirectional AC-to-DC power supply electrically interposed between the electric utility grid and the local bus, the power supply having an AC side and a DC side, wherein the power supply is configured to allow energy flow only from the AC side to the DC side.

U.S. Pat. No. 10,135,251 for Apparatus and method for controlling a microgrid by inventor Berard, filed Dec. 31, 2013 and issued Nov. 20, 2018, discloses power interface devices and methods. The microgrid includes a power interface device coupled to one or more microgrid elements comprising power sources and loads. The method includes determining, by the power interface device, a mode of operation of the microgrid, determining a power load of the one or more microgrid elements, and based on the mode of operation of the microgrid and the power load of the one or more microgrid elements, adjusting, by the power interface device, a frequency of a voltage of the power interface device to control the one or more microgrid elements.

U.S. Pat. No. 11,399,065 for Apparatus, system, method, and computer program product for scaling and managing electric power systems by inventors Thirumurthy et al., filed Jan. 6, 2020 and issued Jul. 26, 2022, discloses energy and demand costs reduction methods through management of an entity load using an energy storage system; simulating the entity load including using predictive analytics; or receiving user inputs of an event schedule impacting entity load; performing optimization at start of billing cycle including establishing a demand reduction target achievable with an energy storage system device implemented; setting a periodic schedule for energy storage system discharge and allocating a portion of energy storage capacity to a reserve to be used in event of volatility in entity load; determining any unused capacity of the energy storage system at an end of a period, and responsive to the determining, redistributing any unused capacity to a remaining period of the schedule; and resetting the demand reduction target for each time-of-use period to what was achieved previously for the same billing period.

US Patent No. 2022/0402390 for A multimodal converter for interfacing with multiple energy sources by inventor Smolenaers, filed Nov. 13, 2020 and published Dec. 22, 2022, discloses a multimodal converter for use in electric vehicle charging stations for interfacing between at least one AC source and two DC sources (including the electric vehicle with onboard DC traction accumulator). The multimodal converter may also be applicable to other uses with a multitude of energy sources. For example, where the multimodal converter AC interface is for an electric motor, such as in a plug-in electric vehicle, an electric power tool, an electric water pump, a wind turbine, or the like, or interfacing with any DC sources such as an electrical battery apparatus, a solar panel array, a DC generator, or the like, whether for private, commercial or other use.

U.S. Pat. No. 10,110,010 for Modular power conversion system by inventors Lucas et al., filed Mar. 14, 2014 and issued Oct. 23, 2018, discloses a method for determining when a connection of a power system to a grid has been disconnected. The method includes the power system supplying a first amount of reactive power to the grid to which the power system is connected, and the power system determining if there is a frequency change within the grid. This includes if the frequency change does not exceed a predetermined threshold, the power system supplying a second amount of reactive power to the grid, and if the frequency exceeds a predetermined threshold, the power system supplying a first amount of reactive power to the grid.

US Patent No. 2022/0161677 for Battery-enabled, direct current, electric vehicle charging station, method and controller therefor by inventors Pizzurro et al., filed Sep. 2, 2021 and published May 26, 2022, discloses an electric vehicle charging station comprising a direct current (DC) bus configured to receive DC power from multiple power sources including at least one battery energy storage system (BESS); at least one electric vehicle charging stall connected to the DC bus and configured to charge an electric vehicle load; and a controller configured to monitor and control power flow from the DC bus to the at least one electric vehicle charging stall and to monitor and control power flow between the BESS and the DC bus.

U.S. Pat. No. 11,283,262 for Method and control device for operating a stationary, electric energy storage that is provided for an electric consumption unit by inventors Arslan et al., filed Sep. 10, 2019 and issued Mar. 22, 2022, discloses a method operating an electric energy storage for an electric consumption unit, wherein the electric consumption unit is additionally coupled to an electric power grid. The method is characterized in that the control device performs the following steps of a) providing different operation logics for controlling the power flow as a function of the state of charge and of a total unit load, b) observing a status signal that is signaling the present and/or the next supply condition of the grid, c) selecting one of the operation logics as an active operation logic depending on a current value of the status signal, and d) operating the power converter according to the active operation logic.

U.S. Pat. No. 10,005,371 for Grid integration with photovoltaic generation and electric vehicle charging by inventors Reineccius et al., filed Jul. 8, 2016 and issued Jun. 26, 2018, discloses a system and methods for electric vehicle charging. A preferred charging rate associated with an electric vehicle is determined. The preferred charging rate is compared with a first charging rate associated with a utility service current source and a second charging rate associated with an electrical energy storage device. The utility service current source supports the first charging rate and the electrical energy storage device supports the second charging rate, where the second charging rate is greater than the first charging rate. A transfer switch is instructed to select one of the utility service current source and the electrical energy storage device based on the comparison. The transfer switch is coupled to an electric vehicle charger and supplies current to the electric vehicle charger via the selected current source. The electric vehicle is charged at the preferred charging rate using at least the selected current source.

U.S. Pat. No. 9,489,701 for Adaptive energy management system by inventors Emadi et al., filed Mar. 13, 2013 and issued Nov. 8, 2016, discloses systems, methods, and devices related to a microgrid system for providing power to a facility. A self-contained power system provides power to a facility using a combination of power storage elements and renewable energy sources. A connection to an external power grid may also be provided. The system optimizes power flow to the facility using power from the storage elements and the renewable energy sources and, if necessary, the external power grid. The optimization process predicts future power usage by the facility using power usage data from a predetermined time window. The optimization process can also take into account predicted energy generation amounts by the renewable energy sources. To optimize economic effects, the optimization process can also determine whether to buy and when to buy power from the external power grid.

U.S. Pat. No. 11,251,620 for Micro-grid site predictive control for multipower resource management with machine learning by inventors Cai et al., filed Mar. 3, 2020 and issued Feb. 15, 2022, discloses a device receiving a power demand for a load and a weather forecast for a time period. The device may determine a first supply of power available from a photo-voltaic (PV) installation for the time period based on the weather forecast. The device may determine a power deficit for the time period based on the power demand and the first supply of power. The device may determine a first cost associated with utilizing a second supply of power available from a battery and a second cost associated with utilizing a third supply of power available from an engine for the time period. The device may determine a power source to overcome the power deficit based on the first cost and the second cost and may cause the PV installation and the power source to supply power to satisfy the power demand for the load.

SUMMARY OF THE INVENTION

The present invention relates to microgrid systems, and more specifically to microgrids with simplified connection of multiple power sources, with bypasses for improved resilience.

It is an object of this invention to provide a microgrid system incorporating multiple power sources capable of powering critical systems in a facility in a resilient manner with fewer required components than existing prior art systems.

In one embodiment, the present invention is directed to a microgrid system, including a power router, including a central transformer connected to power sources and loads via a plurality of windings, a grid bypass connected to the power router via a first port, a plurality of loads connected to the power router via a plurality of load ports, one or more batteries connected to the power router via one or more battery ports, one or more power generators connected to the power router via one or more generator ports, and a controller operable to control an amount of power supplied to or sourced from each port, wherein the system receives a designation of one or more ports as a critical port, wherein the system is operable to detect an amount of power available from each of the one or more battery ports and the one or more generator ports in real time, wherein the system is operable to detect an amount of power demand from each of the plurality of load ports in real time, and wherein the controller automatically reduces or cuts power to one or more of the plurality of load ports based on the amount of power available from each of the one or more battery ports and the one or more generator ports, the amount of power demand from each of the plurality of load ports, and the designation of the critical port.

In another embodiment, the present invention is directed to a method for operating a microgrid, including connecting a power router, including a central transformer, to one or more batteries, one or more power generators, and a plurality of loads via a plurality of windings, a controller controlling an amount of power supplied to or sourced from each port, receiving a designation of one or more of the plurality of windings as a critical port, detecting an amount of power available from each of the one or more batteries and the one or more generators in real time, detecting an amount of power demand from each of the plurality of loads in real time, and the controller automatically reducing or cutting power to one or more of the plurality of loads based on the amount of power available from each of the one or more batteries and the one or more generators, the amount of power demand from each of the plurality of loads, and the designation of the critical port.

In yet another embodiment, the present invention is directed to a microgrid system, including a power router, including a central transformer connected to power sources and loads via a plurality of windings, a plurality of loads connected to the power router via a plurality of load ports, one or more batteries connected to the power router via one or more battery ports, one or more power generators connected to the power router via one or more generator ports, and a controller operable to control an amount of power supplied to or sourced from each port, wherein the system receives a designation of one or more ports as a critical port, wherein the system is operable to detect an amount of power available from each of the one or more battery ports and the one or more generator ports in real time, wherein the system is operable to detect an amount of power demand from each of the plurality of load ports in real time, wherein the controller automatically reduces or cuts power to one or more of the plurality of load ports based on the amount of power available from each of the one or more battery ports and the one or more generator ports, the amount of power demand from each of the plurality of load ports, and the designation of the critical port, and wherein the system includes a DC bypass connected to at least one of the one or more battery ports, and wherein the system automatically initiates the DC bypass upon detection of a fault of the one or more generator ports.

These and other aspects of the present invention will become apparent to those skilled in the art after a reading of the following description of the preferred embodiment when considered with the drawings, as they support the claimed invention.

BRIEF DESCRIPTION OF THE DRAWINGS

PRIOR ART

DETAILED DESCRIPTION

Figure 1:
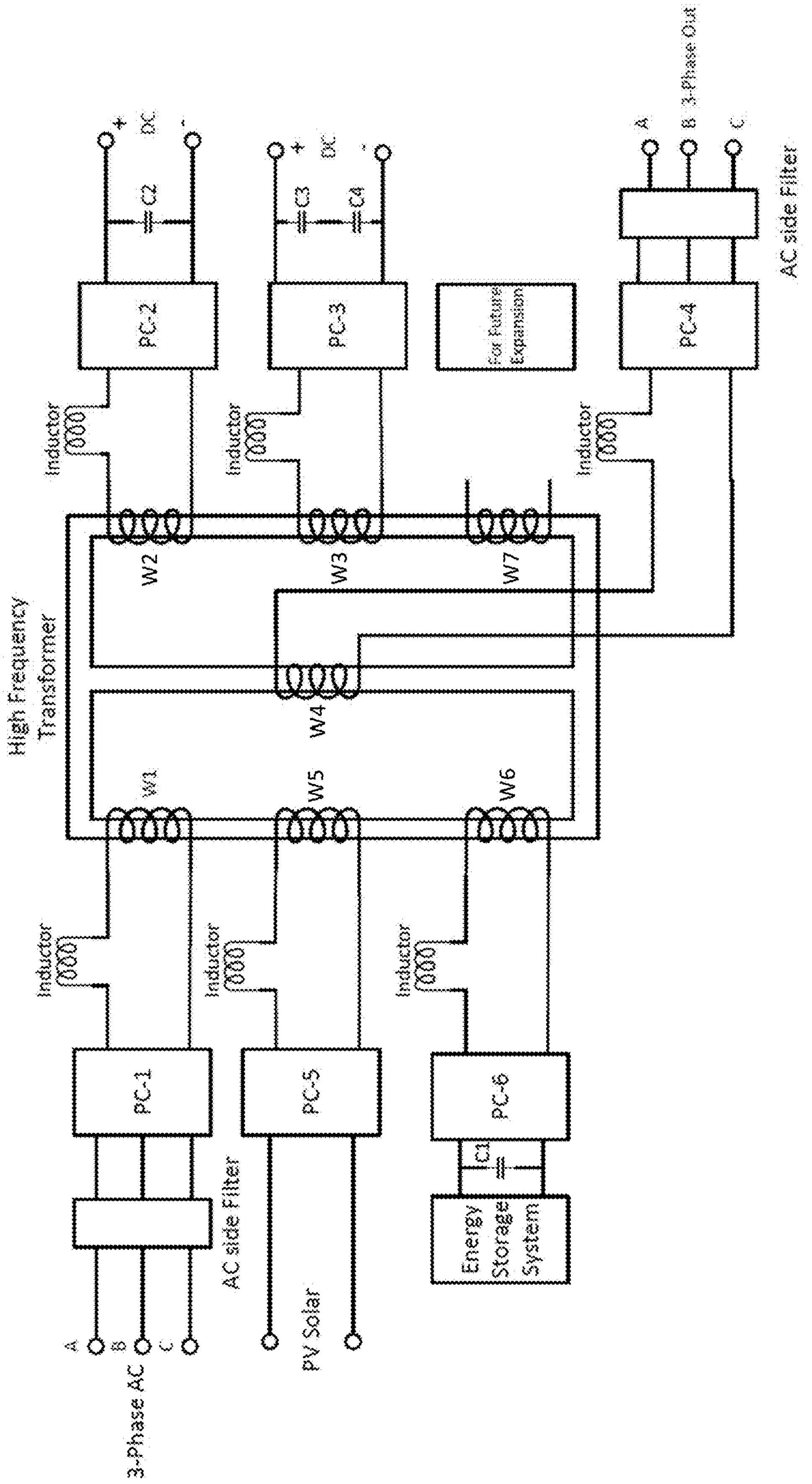
FIG. 1 is a circuit diagram of a modular, multiport power conversion system including seven ports according to one embodiment of the present invention.

The present invention is generally directed to microgrid systems, and more specifically to microgrids with simplified connection of multiple power sources, with bypasses for improved resilience.

In one embodiment, the present invention is directed to a microgrid system, including a power router, including a central transformer connected to power sources and loads via a plurality of windings, a grid bypass connected to the power router via a first port, a plurality of loads connected to the power router via a plurality of load ports, one or more batteries connected to the power router via one or more battery ports, one or more power generators connected to the power router via one or more generator ports, and a controller operable to control an amount of power supplied to or sourced from each port, wherein the system receives a designation of one or more ports as a critical port, wherein the system is operable to detect an amount of power available from each of the one or more battery ports and the one or more generator ports in real time, wherein the system is operable to detect an amount of power demand from each of the plurality of load ports in real time, and wherein the controller automatically reduces or cuts power to one or more of the plurality of load ports based on the amount of power available from each of the one or more battery ports and the one or more generator ports, the amount of power demand from each of the plurality of load ports, and the designation of the critical port.

In another embodiment, the present invention is directed to a method for operating a microgrid, including connecting a power router, including a central transformer, to one or more batteries, one or more power generators, and a plurality of loads via a plurality of windings, a controller controlling an amount of power supplied to or sourced from each port, receiving a designation of one or more of the plurality of windings as a critical port, detecting an amount of power available from each of the one or more batteries and the one or more generators in real time, detecting an amount of power demand from each of the plurality of loads in real time, and the controller automatically reducing or cutting power to one or more of the plurality of loads based on the amount of power available from each of the one or more batteries and the one or more generators, the amount of power demand from each of the plurality of loads, and the designation of the critical port.

In yet another embodiment, the present invention is directed to a microgrid system, including a power router, including a central transformer connected to power sources and loads via a plurality of windings, a plurality of loads connected to the power router via a plurality of load ports, one or more batteries connected to the power router via one or more battery ports, one or more power generators connected to the power router via one or more generator ports, and a controller operable to control an amount of power supplied to or sourced from each port, wherein the system receives a designation of one or more ports as a critical port, wherein the system is operable to detect an amount of power available from each of the one or more battery ports and the one or more generator ports in real time, wherein the system is operable to detect an amount of power demand from each of the plurality of load ports in real time, wherein the controller automatically reduces or cuts power to one or more of the plurality of load ports based on the amount of power available from each of the one or more battery ports and the one or more generator ports, the amount of power demand from each of the plurality of load ports, and the designation of the critical port, and wherein the system includes a DC bypass connected to at least one of the one or more battery ports, and wherein the system automatically initiates the DC bypass upon detection of a fault of the one or more generator ports.

Energy demand is increasing, with increases in sales of devices such as electric vehicles signaling a need to stabilize and scale the grid. Needs for supplying power to the electric power grid are multivariate, including needs for more efficient energy generation, energy storage, and energy distribution. One issue with energy distribution is the expanding physical footprint of the grid infrastructure used to coordinate and deliver power to specific sources. Additionally, scalability of existing infrastructure poses challenges as well. With existing systems, if new components need to be added to a grid, critical portions of grid infrastructure, such as power conversion systems, need to be taken offline or replaced entirely. This is both inconvenient and often impractical, as downtime of the grid often has devastating consequences. For this reason, rather than expanding existing infrastructure, grid designers often need to create new elements of the grid, including new power conversion systems, expanding the physical blueprint taken up by these devices.

Existing systems need new reliable methods of scaling grid conversion systems, such that new sources and power consuming loads are able to be added or dropped at will. Furthermore, improvements need to increase the spatial efficiency of power conversion systems, preferably allowing multiple distributed energy sources to be converted at a single location and provided to a plurality of sources either at the same location or in different locations, the latter also being made possible by enhanced grid-support services such as demand response or "virtual power plant". Because electric vehicles are able to act as sources of power and other distributed energy sources, including solar panels, are becoming more popular, the integration of a distributed energy system is likely to become more critical in the future. Finally, for systems incorporating multiple energy sources and sinks at a single location, methods for isolating individual connected devices need to be provided, to avoid risk of contamination of the larger grid from failure of a single device.

Referring now to the drawings in general, the illustrations are for the purpose of describing one or more preferred embodiments of the invention and are not intended to limit the invention thereto.

FIG. 1 is a circuit diagram of a modular, multiport power conversion system including seven ports according to one embodiment of the present invention. The present invention includes a modular, multiport power conversion system (MM-PCS). The PCS includes a central transformer with a plurality of ports that form an integral part of the PCS. The ports are able to include both alternating current (AC) and direct current (DC) ports as either sources or sinks for power, allowing various power sources to be used to charge attached components. DC ports are able to have either positive or negative polarity, or split 3-wire ports with positive, zero, and negative voltage polarities. Furthermore, AC ports included in the PCS include single phase or three-phase AC ports. This is particularly useful for integrating a plurality of distributed energy resources and distributed energy storage systems for connecting those resources to various power consuming loads via a single PCS unit. This forms a sort of "matrix" of both sinks and sources that are able to be controlled simultaneously. The matrix is able to provide power transfer between any two (or more) of the ports, while able to isolate other ports, such that the system is able to selectively draw power from or transfer power to connected devices. The PCS is able to provide power simultaneously from a plurality of sources to a single power consuming load, or for multiple power consuming loads to draw power from a single power source simultaneously. In one embodiment, types of power sources able to be connected to the PCS include, but are not limited to, at least one battery, at least one solar cell, at least one wind turbine, at least one power plant, at least one microgrid, at least one steam turbine, at least one electric vehicle, and/or any other form of power supplying or power storage device.

The number of ports of the PCS is equivalent to the number of windings around the central transformer, with more windings providing possibilities for more energy sources or energy storage devices to connect to the system. In one embodiment, the PCS includes at least three, at least five, at least seven, at least nine, at least twenty, at least fifty, and/or any other number of windings, and therefore any number of corresponding ports. One of ordinary skill in the art will understand that the number of primary windings (i.e., windings that draw power from a source) and the number of secondary windings (i.e., windings that deliver power to a load) are not intended to be limited according to the present invention. Ports are able to be added or removed over time by adding (or enabling) or removing (or disabling) windings to the transformer, allowing for, by way of example and not limitation, a three-port PCS to later be used for a seven-port application, greatly improving scalability of the system. Instead of being thought of as being limited to a specific number of ports or connected devices, the scalability of the central PCS is only really limited by the volt-ampere (VA) rating of the central transformer. In one embodiment, the VA rating of the central transformer is between approximately 1 VA and approximately 1000 MVA. One of ordinary skill in the art will understand that the VA rating of transformers used in the present invention are not intended to be limiting and will depend on the application for which each PCS is used. It is also therefore important that, if new ports are added to the PCS at a later time, that the addition of the new ports not cause the transformer to exceed its VA rating, where that VA rating limit may also be enforced by controls logic.

In one embodiment, a first port (PC1) is a three-phase AC port, including an AC-side filter, and connected to the central transformer by a first winding (W1). In one embodiment, a second port (PC2) is a DC port including a single capacitor (C2) between the leads, and connected to the central transformer by a second winding (W2). In one embodiment, a third port (PC3) is a DC port including multiple capacitors (C3, C4) between the leads and connected to the central transformer by a third winding (W3). In one embodiment, a fourth port (PC4) is a three-phase AC port including an AC side filter and connected to the central transformer by a fourth winding (W4). In one embodiment, a fifth port (PC5) is connected to at least one solar cell and connected to the central transformer by a fifth winding (W5). In one embodiment, a sixth port (PC6) is a DC port connected to at least one energy storage system including at least one capacitor (C1) between the leads and connected to the central transformer by a sixth winding (W6). In one embodiment, a seventh winding (W7) is connected to the central transformer and is able to connect to and form a seventh node of any type.

The relative voltage across, or current supplied or drawn from the central transformer for each port, is able to be modified based on a turn ratio for the winding for each port. This allows the transformer to step up or step down the voltage and/or current from individual sources or to individual sinks as needed to address a variety of needs, allowing for a more modular configuration of the PCS. Therefore, the same PCS is capable of acting as a buck converter (i.e., stepping down voltage) between one or more sources and one or more sinks or a boost converter (i.e., stepping up voltage) depending on the needs of the specific situation. Furthermore, in one embodiment, the central transformer includes a plurality of parallel circuit paths, such that additional windings (and therefore additional ports) are able to be added in series, which will increase the voltage rating of the combined port) or in parallel, which will increase the current rating of the combined port. However, the PCS can also use current and voltage control schemes to provide buck or boost operation even with a fixed turns ratio.

The central transformer of the PCS in the present invention provides galvanic isolation between each of the ports, reducing the danger of electric shocks or current cross-over between components connected to each port. The galvanic isolation is what mainly allows for selectivity in transferring power from one specific port A in the PCS to another specific port B, even if the PCS includes more ports than simply port A and port B. In one embodiment, a controller for the PCS is able to switch between islanding and grid connected modes for the PCS. The ability to individually isolate each port also allows for the system to easily cut off and replace individual ports with new ports, either for purposes of upgrade or repair, without turning off the PCS as a whole, providing for the ability to perform "hot swaps." Furthermore, failure of an individual port does not cause failure of the entire PCS, as the failed port is able to be easily isolated and cut off from the system. In one embodiment, in the event of a faulty port, the voltage for the faulty port is dialed (or programmed) to a predetermined "touch safe" voltage (e.g., by a controller connected to the PCS system). By way of example and not limitation, in one embodiment, the touch safe voltage is equal to approximately 0 V or is less than approximately 60 V or even 28 V. In one embodiment, faults at individual ports are detected by at least one fault detection algorithm, which is used to determine when the controller should dial, or program, the port to the touch safe voltage. Active control of the voltage conditions is useful for a shutdown and disconnect procedure for individual ports, while helping to prevent arc flashes, especially for DC ports. In one embodiment, active voltage control is also used when each port is ramped up into operating condition. Connection of the windings in series or in parallel on the transformer does not eliminate the advantage of galvanic isolation for the system, allowing for high selectivity and modularity for the added ports.

In one embodiment, the at least one fault detection algorithm operates, at least in part, based on data received from current sensors (e.g., open loop, closed loop, flux-gate, etc.) measuring current into and/or out of one or more of the individual ports. In one embodiment, the at least one fault detection algorithm operates, at least in part, based on data received from voltage sensors (e.g., capacitive-type voltage sensors, resistive-type voltage sensors, etc.) measuring voltage across one or more of the individual ports. In one embodiment, for one or more of the individual ports, the at least one fault detection algorithm detects faults based on higher-than-expected input current levels (i.e., an undercurrent condition), greater-than-expected output current levels (i.e., an overcurrent condition), less-than-expected voltage levels (i.e., an undervoltage condition), greater-than-expected voltage levels (i.e., an overvoltage condition), and/or detection of an arc. In one embodiment, arc fault detection is based on detection of a known high frequency signal coupled with one or more associated voltage or current levels. In one embodiment, the fault detection algorithm is based on detecting more than one fault condition simultaneously (e.g., an overcurrent condition and an undervoltage condition). In one embodiment, whether fault conditions occur "simultaneously" is based on whether they occur and/or are detected within a preset time period. In one embodiment, the preset time period is approximately 100 microseconds.

In one embodiment, each port is separately grounded, including its own ground reference, further providing for galvanic isolation. Furthermore, ports having separate grounding systems provides for improved scalability of the PCS in terms of both power and voltage output.

In one embodiment, one or more of the ports are capable of using zero-voltage switching (ZVS). ZVS is particularly useful for high-frequency applications, especially for power grid applications, as high-frequency circuits switch frequently and thus suffer more greatly from switching losses. ZVS utilizes pulse-width modification (PWM) operations to, in a first mode, delay the onset of a drain current in a switching transistor until the drain-source voltage over the transistor is zero and later, in a second mode, slows or delays the rate of increase of the drain-source voltage while the drain current drops to zero. This greatly decreases the overlap between drain current and drain-source voltage, thereby decreasing parasitic or switching power loss in the circuit, decreasing noise, and increasing the efficiency of the system. ZVS is especially beneficial in transformer-related applications, as it decreases transformer inductance loss as well. In one embodiment, the ZVS is achieved through inclusion of at least one resonant circuit between the source voltage connected to each port and the corresponding winding connected to the transformer for each port. In one embodiment, the switch includes at least one metal-oxide semiconductor field effect transistor (MOSFET) and/or at least one insulated-gate bipolar transistor (IGBT).

The magnetizing inductance of the transformer demonstrates a lagging current that is able to be designed as a specific fixed percentage of the full load rated current of the transformer. During light load current conditions, the magnetizing current essentially provides negative, or lagging, current during a switch voltage transition for the power converter. The negative, or lagging, current enables the system to discharge the device capacitance of the switches being turned on, which provides the zero voltage switching for the switch being turned on. Additionally, the negative, or lagging, magnetizing current enables charging the capacitor for the switch being turned off. With this system, a bulkier resonant circuit is not required.

In one embodiment, one or more of the ports are capable of using zero-current switching (ZCS). ZCS is, similarly to ZVS, very beneficial for high frequency applications. ZCS is similar to ZVS except that, in the first mode, it slows or delays the rate of increase of the drain current, and, in the second mode, it delays the increase of the drain-source voltage until the drain current drops to zero. Similarly to ZVS, in one embodiment, the ZCS is achieved through inclusion of at least one resonant circuit between the source voltage connected to each port and the corresponding winding connected to the transformer for each port. In one embodiment, the switch includes at least one metal-oxide semiconductor field effect transistor (MOSFET) and/or at least one insulated-gate bipolar transistor (IGBT).

Figure 2:
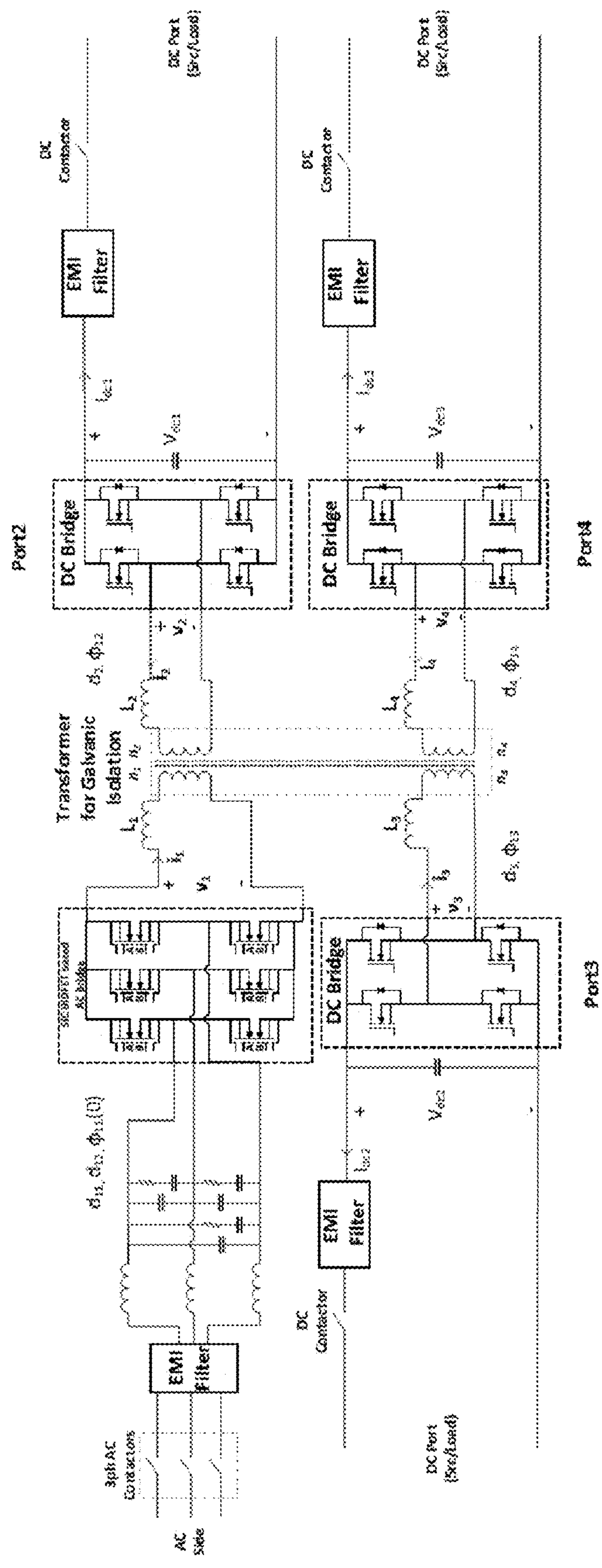
FIG. 2 is a circuit diagram of a four-port multiport converter architecture according to one embodiment of the present invention.

FIG. 2 is a circuit diagram of a four-port multiport converter architecture according to one embodiment of the present invention. One of ordinary skill in the art will understand that while a four-port architecture is depicted in FIG. 2, alternative embodiments including various other numbers of ports are also contemplated herein, as the architecture is scalable to greater than four ports by increasing the capability of the central transformer and connecting more limbs to it. The architecture shown is modular, allowing added ports to be AC three-phase without neutral, AC three-phase with neutral, AC single phase, or DC, depending on the type of application. In FIG. 2, a version is depicted with one AC three-phase without neutral port and three DC ports. However, an AC three phase with neutral is also able to be incorporated into the same multiport architecture. In one embodiment, the architecture includes inductors to assist in power transfer. In one embodiment, MOSFETs are included in universal configurations (e.g., back-to-back switches, also called AC switches) for either AC or DC ports, and H-bridge configurations, which are only used for DC ports. In one embodiment, one or more filters are included, with different configurations depending on AC or DC applications. Contactors are also included with three-phase AC, single-phase AC, or DC. One of ordinary skill in the art will understand that other protection elements, such as surge protectors or ground-fault detectors/interrupters or fuses are also able to be included, though are not shown in FIG. 2.

For all types of ports, whether they are AC ports or DC ports, there is a transformer and there is a plus connection and a minus connection, providing a minimum of two connections. Each connection point has a decoupling impedance associated with it, with the impedance being an inductor, a capacitor, a resister, or any combination thereof, referred to as a decoupling network. Each decoupling network is connected to a connection point (e.g., the plus connection, the minus connection, etc.) is one half of the total decoupling impedance. Careful selection of the decoupling impedance allows for power flow across the terminals at different frequencies. It also allows for high frequency decoupling of signals and noise from different terminals to other terminals through parasitic inter-winding capacitance of the transformers. Alternatively, the parasitic impedance of the transformer is able to be inductive, inductive-capacitive, and even inductive-capacitive with multiple inductors (Ls) and capacitors (Cs) (or even resistors (Rs)) dominant at different frequencies. Careful selection of the decoupling impedance also allows for careful coupling of different factors of the low frequency and high frequency signals from one port to another port given the decoupling impedance design versus the transformer impedance design. Furthermore, the careful selection of the decoupling impedance also ensures stability of machine operation in multiple modes across all ports under input and output voltage variations. At all levels, the system is able to match the decoupling impedances to the transformer impedance curves as reflected from a first port to a second port, or as reflected from the second port to the first port. The decoupling impedances are the same from winding one to winding two (from winding 1 to winding n) or are different (from winding 1 to winding n). Decoupling impedances are switched for different transfer characteristics for different sources and loads. Furthermore, the system is able to convey power or to convey communications, or to convey both using various decoupling impedance characteristics.

Advantageously, a fault on any one port in the system only leads to that port alone becoming unavailable, with the remaining ports continuing to function as is. The central transformer provides galvanic isolation from one port to the rest, hence enabling continued, uninterrupted operation, which also provides safety. Each port has a dedicated set of contactors to isolate the port from the source or load to which it is connected. Firmware used for the modular multiport system implements a defined state machine to periodically check for faults, as part of major transitions, and the firmware follows a predefined set of procedures to isolate the faulty port from the rest of the system.

Faults on ports in the system are able to be broadly categorized into one of the following types discussed below. First, instantaneous overvoltage or overcurrent is able to be detected within a few microseconds by observing the transformer voltages and currents. For overvoltage, the port is immediately isolated by stopping MOSFET switching. For overcurrent, the transistors are repeatedly turned off and on to first supply inrush current to a connected load, and if the fault persists, to clear a fuse or breaker. If the overcurrent persists given the limits of the $i^2t$ curve of the machine, the port is then isolated by stopping MOSFET switching to prevent damage to the machine and to resume operation of all other valid ports. In the case of instantaneous overvoltage or overcurrent, the port is connected after opening contactors and the port is marked as unavailable on a user interface for the modular multiport system.

A second type of fault occurs when one or more MOSFETs fails to open. This is able to be detected within a few microseconds by observing the gate driver faults as well as transformer voltages and currents. The port is then immediately isolated by stopping MOSFET switching, with the port being disconnected after opening contactors and marked as unavailable on a user interface for the modular multiport system.

A third type of fault occurs when one or more MOSFETs fails to close. This is able to be detected within a few microseconds by observing the gate driver faults as well as the transformer voltages and currents. The ports are then immediately isolated by stopping MOSFET switching if there is a universal port configuration, with the ports being disconnected after opening contactors and marked as unavailable on a user interface for the modular multiport system.

A fourth type of fault is a contactor weld, which is able to be detected as part of the state machine either during startup or after there is a need to disconnect the port manually or automatically, as part of the requirements of the application. The port is then able to be isolated immediately by stopping MOSFET switching (in a universal port configuration) and then port is marked as unavailable on a user interface for the modular multiport system.

A fifth type of fault is a ground isolation fault. In some applications, periodic checking is performed for isolation of the ports with the ground. Preferably, the periodic isolation tests are performed as part of the state machine before commencing power flow, or even during power flow. If the isolation test marginally fails with a warning, the port is ramped down in voltage and current, the contactor is opened, and the port is marked as unavailable on a user interface for the modular multiport system. If the isolation test fails with an error, the power flow to that port is immediately interrupted by stopping MOSFET switching, the contactor is opened, and the port is marked as unavailable on a user interface for the modular multiport system.

For any type of port failure, if it was previously actively sourcing or consuming power, an automatic power flow adjustment is made on other ports without the need for human intervention. If a source port is faulted, other sources increase their power levels to compensate. If the other sources reach capacity, then the power supplied to connected loads is throttled with appropriate indications on a user interface for the modular multiport system. The system is able to receive a user setting of a certain priority to certain loads such that high priority loads stay on while lower priority loads are disconnected. In the event that is only a single source port, which is faulted, power transfer is ceased and the machine is stopped. An additional source port is able to be engaged if it is connected, in which case the converter will transition to the other source port and attempt to provide the entire load demand from that source. The load power potentially needs to be throttled down, however, depending on the time it takes to ramp up other sources (which varies for different types of sources). A priority is also able to be set for certain loads such that higher priority loads stay on while lower priority loads are disconnected for a short time to cover the ramp up delay. In the case of one or more load port failures, the source port powers are throttled down without affecting other, active loads.

In the case of source port transients, there is a need to move away from conventional controls and implement an emergency mode for steering power to the loads. There are many types of emergency modes that are able to be utilized, including storing switching patterns corresponding to different emergency modes, deliberate change of control gains only while in emergency mode and then settling down to normal gains while in emergency mode, or adopting a different non-linear control scheme to control the state of the machine or to control the identified and critical state trajectories. For deeper and/or longer-lasting sags classified as transient(s), when the source port is unable to deliver rated or required and/or assigned power, either another source is ramped up to supply power for a duration or certain loads are prioritized to stay on while lower priority loads are switched off and resumed after the transient(s) has/have subsided. For surges, as long as the surge remains within the safe operating area (SOA) of the device, the port is able to deliver more than the steady-state rated power for a transient case. In this case, the control system goes into emergency mode to detect this situation and compensate for the extra power while continuing to deliver the required power levels for the loads.

Figure 3:
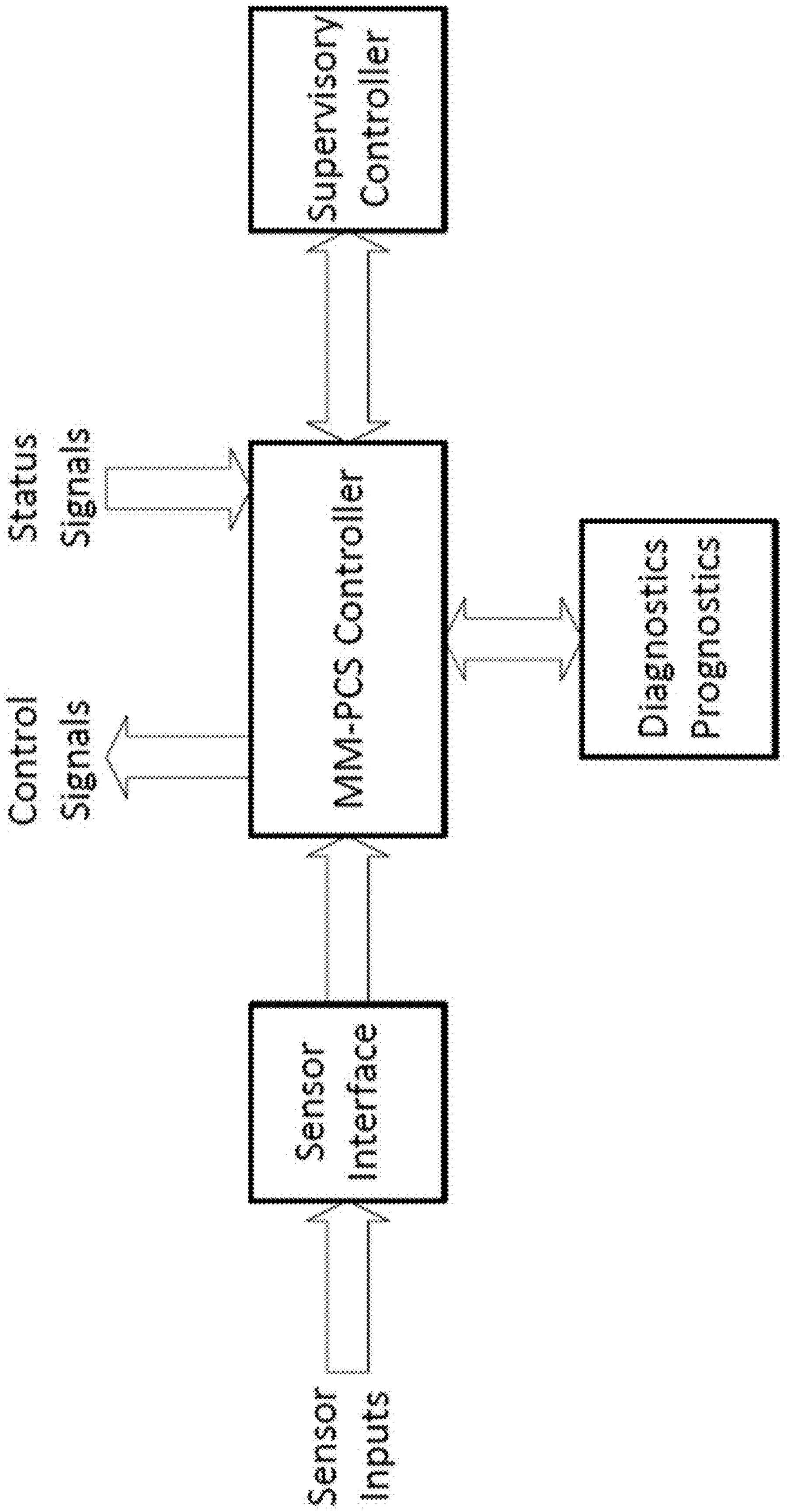
FIG. 3 is a schematic diagram of a system including a modular, multiport power conversion system according to one embodiment of the present invention.

FIG. 3 is a schematic diagram of a system including a modular, multiport power conversion system according to one embodiment of the present invention. In one embodiment, operation of the PCS is directed by at least one MM-PCS controller. In one embodiment, the MM-PCS controller is configured to receive status data from one or more sensors. In one embodiment, the PCS includes at least one sensor monitoring each port of the PCS. If a sensor detects that a port has failed, or transmits a sensed value that indicates failure, then a status update message or respective value is transmitted to the MM-PCS controller, allowing the MM-PCS controller to issue control signals to automatically galvanically isolate and cut-off the compromised port from central transformer, preventing the damaged ports from parasitically drawing current from the PCS or from potentially causing arc flashes or other harmful phenomena between the damaged port and other ports in the system. In one embodiment, the MM-PCS controller is able to connect or disconnect individual ports through the use of programmable breakers, and/or solid-state breakers, and/or AC/DC contactors and/or vacuum breakers, and/or combinations of these breakers and contactors on each port.

The galvanic isolation of the present system is achieved by the use of separate windings to connect each port to the transformer. Current is able to flow only from one winding to another winding by magnetic flux change in the transformer. This change requires explicit switching from each of the involved ports (or more specifically transistors in each port) to allow energy flow, providing for extremely high selectivity in flow path. In one embodiment, programmable contactors provide for selective remote (manual or automatic) transistor switching to allow for the selective switching mechanism. This sort of switching also allows the transformer to provide controlled incoming current to individual loads even where the overall current from all energy resources into the system is quite high, preventing overcurrent from potentially damaging the attached loads.

In one embodiment, multiple PCS units are able to be connected either in parallel or in series, allowing for power scaling as well as voltage scaling of the system. In one embodiment, each PCS unit has its own controller for controlling the voltage supplied to each port of the corresponding PCS unit and allowing for control of power flow between each port. In one embodiment, a supervisory controller operates over multiple PCS units, providing higher level voltage regulation. In one embodiment, the supervisory controller is operable to transmit power flow control commands to one or more individual MM-PCS controllers and/or directly to individual ports of one or more PCS units. In an embodiment of the present invention having multiple PCS units, only the series or parallel ports are electrically connected. In one embodiment, the one or more individual MM-PCS controllers are connected to the at least one supervisory controller wirelessly via one or more dedicated signal frequencies, through at least one EtherCAT cable, and/or through one or more wireless networks (e.g., wireless local area networks, or WLAN, such as WI-FI, wireless personal area networks, or WPAN, such as BLUETOOTH). In one embodiment, one or more individual MM-PCS controllers are connected to at least one energy management system (EMS) (e.g., at least one server) operable to transmit commands to one or more individual MM-PCS controllers and/or to one of more supervisory controller.

In one embodiment, the MM-PCS controller automatically performs diagnostic evaluations of the PCS based sensor data received from a plurality of sensors, allowing the MM-PCS controller to synthesize this data to determine the overall health of the system. In one embodiment, diagnostics and prognostics are performed by a dedicated diagnostic and prognostic module interfaced with the MM-PCS controller. In one embodiment, the diagnostic and prognostic module is a cloud-based module, while, in another embodiment, the diagnostic and prognostic module is a component of a processor of the MM-PCS controller. In one embodiment, the MM-PCS controller is configured to automatically transmit status updates from the PCS as a whole to at least one server and/or at least one database. In one embodiment, the MM-PCS controller is connected, either via cable or wirelessly, to at least one supervisory controller operable to provide new operational parameters to the MM-PCS controller to adjust to different needs of the system (e.g., adjusting a maximum total voltage drop, adjusting a maximum current drawn by specific sinks, etc.). In one embodiment, the MM-PCS controller is capable of controlling a percentage of power delivered or consumed by each port (e.g., port 1 delivers 20% of power, port 2 delivers 80% of power, etc.). In another embodiment, the amount of power delivered or consumed by each port is based on the number of windings in each port's connection to the central transformer.

In one embodiment, the MM-PCS controller is programmed to include at least one schedule of energy resources, indicating that different percentages of power will be delivered from different power sources at different times and/or that different percentages of power will be delivered to different power consuming ports at different times. By way of example and not limitation, in one embodiment, at least one solar cell is attached to a first port of the PCS. During the day time, the MM-PCS controller is configured to draw 50% of the total power input from the first port, as the power generation from the at least one solar cell will be higher. However, during the night time, the MM-PCS controller is configured to only draw 0 to 5% of total power input from the first port, reflecting decreased power production. In one embodiment, the schedule is not based on times of a day, but based on periodically cycling different sources. For example, in one embodiment, power is drawn from a first port for an hour and then drawn from a second port for an hour, with alternation back and forth. In another embodiment, the energy management system can impose any schedule on the source and sink ports to minimize and/or maximize any function.

The MM-PCS controller and/or supervisory controller is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The MM-PCS controller and/or supervisory controller is operable to use any of the aforementioned learning techniques alone or in combination.

Further, the MM-PCS controller and/or supervisory controller is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The MM-PCS controller and/or supervisory controller is preferably operable to recommend and/or perform actions based on historical data, external data sources, ML, AI, NNs, and/or other learning techniques. The MM-PCS controller and/or supervisory controller is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

In one embodiment, predictive analytics and/or machine learning techniques are used by the MM-PCS controller and/or supervisory controller to optimize percentages of power drawn from specific power sources or distributed to specific power consuming devices over time. For example, in one embodiment, the machine learning is trained on historical data of power usage and/or power supply from each port in order to develop a baseline power curve for each port. Baselining helps the MM-PCS controller and/or supervisory controller to determine peak demand times for power consuming nodes on the grid as well as peak power generation times for individual power sources attached to the PCS.

Figure 4:
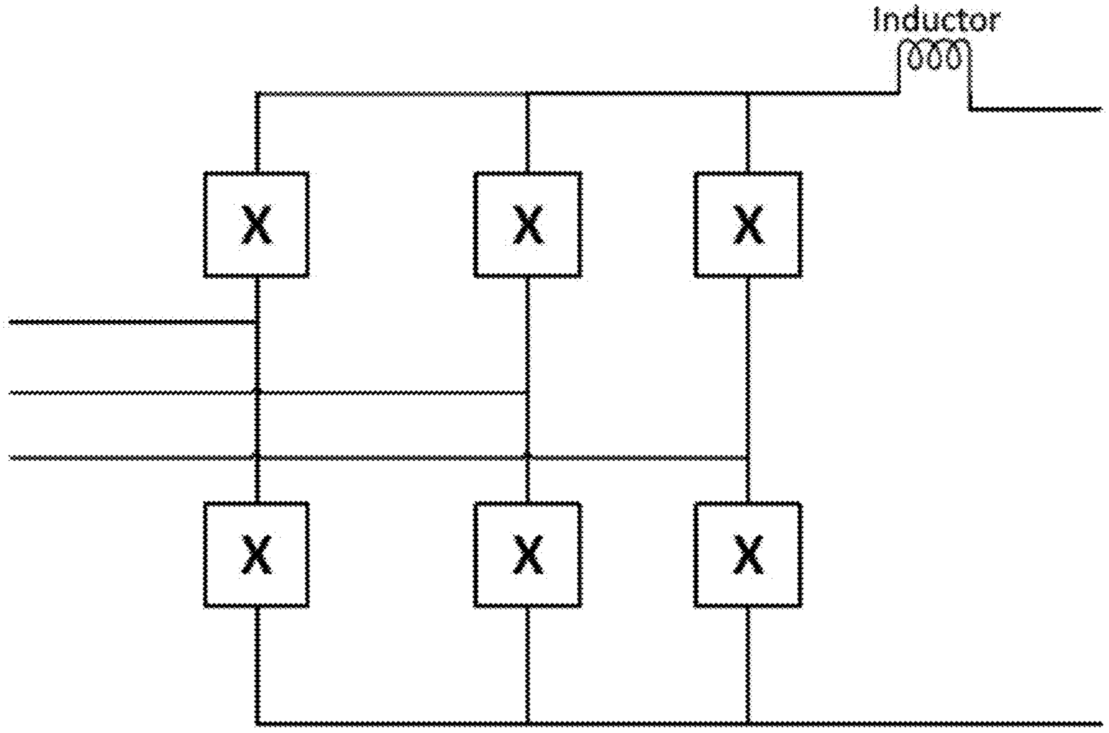
FIG. 4 is a circuit diagram of a three-pole alternating current (AC) port according to one embodiment of the present invention.
Figure 6:
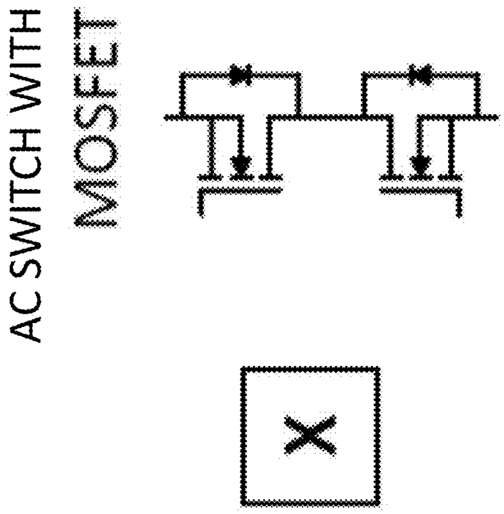
FIG. 6 is a circuit diagram of a MOSFET used in one or more ports of a modular, multiport power conversion system according to one embodiment of the present invention.
Figure 7:
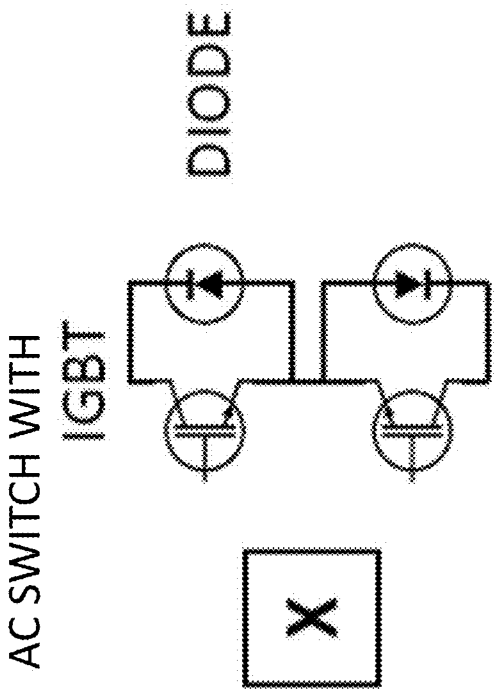
FIG. 7 is a circuit diagram of an insulated-gate bipolar transistor (IGBT) used in one or more ports of a modular, multiport power conversion system according to one embodiment of the present invention.

FIG. 4 is a circuit diagram of a three-pole alternating current (AC) port according to one embodiment of the present invention. AC ports are particularly useful for connecting to power sources, as power generation typically produces alternating current, even where the final power consuming devices require DC. In one embodiment, the Xs shown in FIG. 4 represent transistors in the circuit of the AC port, such as, but not limited to, metal-oxide semiconductor field effect transistors (MOSFETs), as shown in FIG. 6 or insulated-gate bipolar transistors (IGBTs), as shown in FIG. 7.

Figure 5:
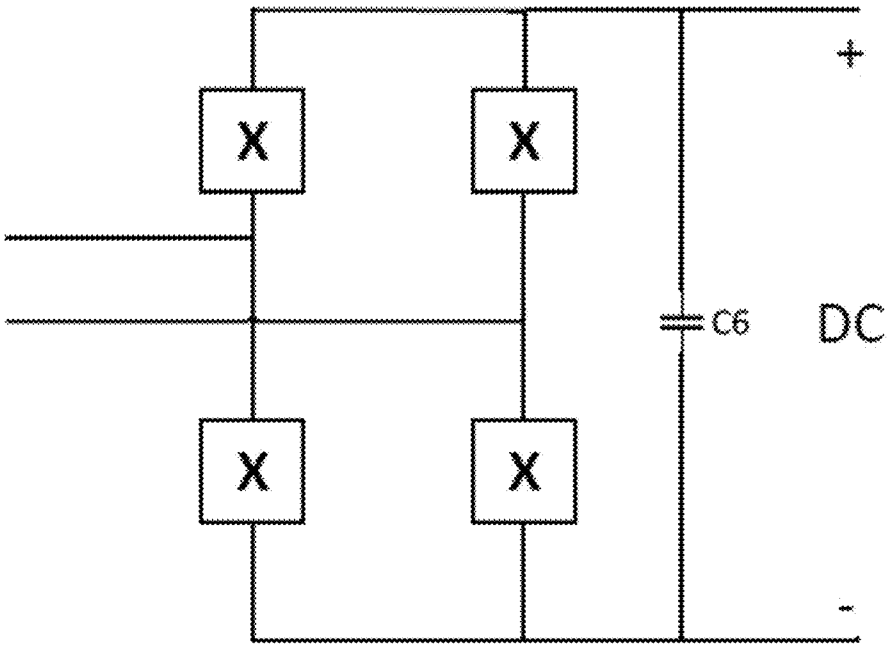
FIG. 5 is a circuit diagram of a direct current (DC) port of a modular, multiport power conversion system according to one embodiment of the present invention.
Figure 8:
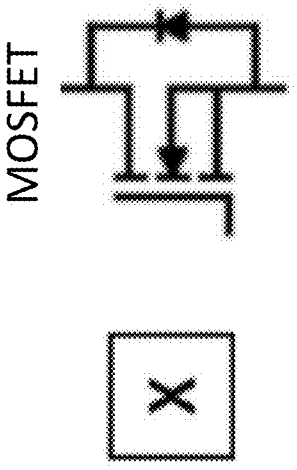
FIG. 8 is a circuit diagram of a MOSFET used in one or more DC ports of a modular, multiport power conversion system according to one embodiment of the present invention.
Figure 9:
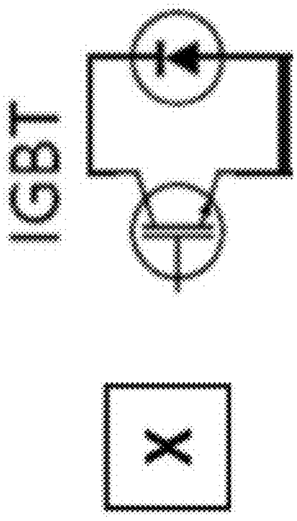
FIG. 9 is a circuit diagram of an IGBT used in one or more DC ports of a modular multiport power conversion system according to one embodiment of the present invention.

FIG. 5 is a circuit diagram of a direct current (DC) port of a modular, multiport power conversion system according to one embodiment of the present invention. DC ports are often, though not limited to, power consuming devices and/or batteries for storing and providing power to the grid. Therefore, having both the ports shown in FIGS. 4 and 5 helps to allow power generating sources and power consuming nodes to attach to the same power system. Preferably, for DC port applications, the Xs shown in FIG. 5 are replaced with the MOSFET shown in FIG. 8 or the IGBT shown in FIG. 9, but not both. However, similar to FIG. 4, in one embodiment, the Xs shown in FIG. 5 represent transistors in the circuit of the AC port, such as, but not limited to, MOSFETs as shown in FIG. 6 or IGBTs as shown in FIG. 7, but not a mixture of both.

One problem posed by the present invention is that of grid forming capabilities, especially when the system is operating in an islanding, as opposed to grid-connected, mode. With large-scale, fossil-fuel (in addition to nuclear and hydroelectric) based energy resources, large spinning turbines have traditionally been used to supply power to the grid. The spinning energy in these turbines provides inertia to the grid that helps stabilize between energy transitions. In particular, this process helps prevent the system's energy from suddenly dropping, providing time for rebalancing supply and loads. Many renewable resources, including solar cells and batteries, however, do not provide such inertia, as they use inverters which are able to flip on and off very quickly, without energy remaining in the form of a spinning turbine. While inverter-based devices are typically able to respond to changes in required frequency more quickly, and therefore have reduced need for inertia, this fails to account for the entirety of the issue. When multiple generators are present, the lack of energy sources with substantial inertia creates an issue with synchronizing the energy sources, creating a need for a grid-forming inverter to set a frequency that other devices follow. An additional issue is with large and potentially sudden peak currents, as often occur with devices such as heating, ventilation, and air conditioning (HVAC) devices. Taken alone, high peak currents are likely to cause significant issues for smaller scale energy resources, such as solar cells.

However, the present system addresses grid forming issues common in renewable resources by providing a connection to multiple energy sources simultaneously, which are able to work together to provide peak currents in order to accommodate new devices coming online. In one embodiment, the system includes a plurality of connected energy sources that combine to contribute a single, larger load current that does not overwhelm individual devices. In one embodiment, the contribution of current from each energy source is dependent on the transient impedance and/or voltage-current curves for each device. In one embodiment, the transient impedance for each source is determined, in real time, by at least one impedance sensor attached to each energy source. In one embodiment, each of the at least one impedance sensor introduces a small perturbation signal in order to determine the transient impedance. In one embodiment, the peak current provided by the present system is at least ten times the average root mean squared (RMS) current of the circuit for at least one second. The capacitor between each battery in the system and the winding assists in preventing the peak current from overwhelming the transient impedance of the batteries, thereby stopping them from being instantaneously drained.

Location data is created in the present invention using one or more hardware and/or software components. By way of example and not limitation, location data is created using the Global Positioning System (GPS), low energy BLUETOOTH based systems such as beacons, wireless networks such as WIFI, Radio Frequency (RF) including RF Identification (RFID), Near Field Communication (NFC), magnetic positioning, and/or cellular triangulation. By way of example, location data is determined via an Internet Protocol (IP) address of a device connected to a wireless network. A wireless router is also operable to determine identities of devices connected to the wireless network through the router, and thus is operable to determine the locations of these devices through their presence in the connection range of the wireless router.

The present invention allows for the integration of multiple energy sources and loads simultaneously with a high degree of control over power proved from each source and to each load, as well as prioritization of particular sources or loads. For systems including photovoltaic cells, for example, power prioritization from those photovoltaic cells is likely desired during daylight hours to make the most of the energy produced. Additionally, the amount of power desired often varies and therefore dynamically shifting the amount of load provided by various sources including the broader grid, if necessary, is important for ensuring that critical loads remain supplied in changing conditions. The system, by allowing for sub-millisecond switching between main power sources and backup power sources (e.g., the broader grid) provides for improved resiliency and decreased chance of outage. Furthermore, the synchronization of loads provided by the power router of the present invention makes it simpler to black start connected critical loads.

The present invention is able to handle varying combinations of both AC and DC sources and loads without requiring large amounts of additional converters or inverters in order to accommodate these components.

In one embodiment, ports are turned on or off, it needs to be determined how much power is being demanded from each output port. In one embodiment, a controller connected to each power supply source and/or each load sends a signal, including time-stamped metadata, to a central third-party controller, when an amount of power demanded or an amount of power supplied changes for the device. This allows the third-party controller to then coordinate reallocation of energy resources within the modular multiport converter. In one embodiment, the third-party controller coordinates its own timings to dynamically match supply and demand entering the system. This system is advantageous as it allows for precise coordination without actually requiring real time clocks, as the controller's discretion manages the supply-demand tracking, rather than real time inputs. However, this system also necessitates some amount of additional delay for allowing coordination and therefore is potentially not preferable for highly dynamic and fast changing systems. In another embodiment, a central third-party intermediary controller is not utilized and the distributed controllers communicate directly with each other. In one embodiment, in order to change the power drawn or power supplied through individual ports, the controllers are operable to manipulate at least one switch and/or otherwise affect an impedance associated with each port.

In one embodiment, each time a new device is connected to the modular multiport converter system, the distributed controllers automatically calculate a delay time for each connected device by measuring an amount of time required for a call and response signal and dividing by two. By determining the delay time for each device, the system is then able to automatically impose a response delay of at least the maximum delay timing of all connected devices, ensuring that the system is able to account for the delay of any connected devices. This allows for an easy rule for determining delay of individual devices, though it is reliant on each device having a relatively consistent delay timing and on the response time to the controller and back being substantially equal. In one embodiment, if a controller does not receive a response from a device (or does not receive a response within a preset threshold amount of time, e.g., one minute), then the node is assumed to be disconnected and the delay time from that node is not factored into the synchronization.

In one embodiment, distributed controllers/gate drive boards are then able to coordinate such that a minimum delay time (in responding to increases in demanded power from individual nodes associated with the distributed controller) is imposed on each controller equal to the maximum delay time of any node in the system, therefore allowing devices to respond simultaneously to changes in the supply and demand state of the system. In one embodiment, distributed controllers from separate multiport systems are able to cross-communicate to synchronize a plurality of multiport converter systems. This is especially useful in situations where, at a macro-level, decreases in total power demand for one multiport system is lower than average, while demand for another spikes, for example, in a situation where one user is away and therefore not drawing power, but a neighboring user has a spike in demand, which allows reallocation of power supply resources at a more macro-level. In one embodiment, synchronization time stamps are different for different levels of organization (e.g., for grid elements connected to and controlled by the same controller versus for different ports controlled by different, distributed controllers versus for entirely separate multiport systems). Therefore, in one embodiment, controllers associated with each port are able to synchronize signals from elements within the same port at different intervals/sampling rates compared to the intervals or sampling rates at which all of the distributed controllers within the multiport system synchronize with each other.

In another embodiment, one controller is a designated leader controller that provides a clock signal to other, follower distributed controllers for a multiport converter system (or a plurality of multiport converters). In one embodiment, a second controller is a designated vice-leader that provides a backup clock signal to the other distributed controllers in the event that the designated leader controller malfunctions, loses signal, or otherwise is unable to carry out its role.

In one embodiment, one or more controllers operable to control the modular multiport converter system are operable to transmit status information regarding one or more ports (preferably each port) of the modular multiport converter system to a processor. In one embodiment, the one or more controllers have a sampling rate for each port of approximately 1 MHz, allowing for true real-time information to be gathered for each port. In one embodiment, the status information includes an amount of power currently being supplied or drawn by each port, an average amount of power supplied or demanded over one or more periods of time by each port, a frequency of each port, and/or other information. In one embodiment, based on the status information, the processor is able to generate a real time representation of the ports, advantageously providing indications of which ports are providing or drawing the most power, or which ports have the greatest variability in power supplied or demanded. In one embodiment, the real time representation is a visual representation shown on at least one display connected to the processor. In one embodiment, the real time representation provides a digital twin of the modular multiport converter system that is manipulable by a user. For example, in one embodiment, the processor is able to receive a command to override automatic operation of the controller and to cut off power supplied to any given port, cut off power drawn from any given port, increase power supplied to a given port, and/or increase power supplied by a given port, so as to provide manual hands-on operation of the system in the event that factors must be addressed that the controller cannot adequately take into account. For example, if, during a storm, a specific power consuming device is heavily damaged and there is a concern about the device short circuiting, an operator is able to manually cut power to that port, even if the controller does not detect the issue.

In addition to synchronizing the timing of needed supply and demand, it is also important that the system synchronize the phase of the ports. In a preferred embodiment, phase-locked loops are used for phase matching and synchronization of the phase of the signals from each port. However, in another embodiment, one or more other known techniques for phase matching are used to synchronize the phase of the signals, including but not limited to, frequency-locked loops (FLLs), delay-locked loops, zero-crossing detection (ZCD), and/or one or more other known phase and frequency synchronization techniques. PLLs used in the present invention are able to be constructed in any way known in the prior art, including the use of a phase comparator to compare the phase of a specific port to the phase of one or more reference ports, and a voltage controlled oscillator used to control the frequency and/or phase of the signal, such that the oscillator allows matching of the port parameters to that of the one or more reference ports.

The use of PLLs is important for the converters used in the system to synchronize with an AC grid or AC generator's phase and frequency. In one embodiment, when the AC converter is used as an output port, the AC converter specifically includes a PLL to ensure that the respective output current from the port is in-phase or has the appropriate phase shift to match the system per the incoming grid voltage for controlling the power outflow to the grid. Alternatively, when the AC converter is used more as an input port, the PLL is used to synchronize the input AC voltage for power inflow from the grid. Preferably, the system utilizes a digital PLL enacted through one or more onboard controllers for the modular, multiport system. This digital PLL allows the system to quickly adapt to dynamic grid conditions, such as identifying grid sag and fault conditions and accordingly changing the device operating mode and/or state if such change is necessary to maintain synchronization with the grid during these disturbances. The digital PLLs also facilitate a greater number of adaptable control elements and respective gains for maintaining synchronization with respective input ports or output ports during grid disturbances.

Figure 10:
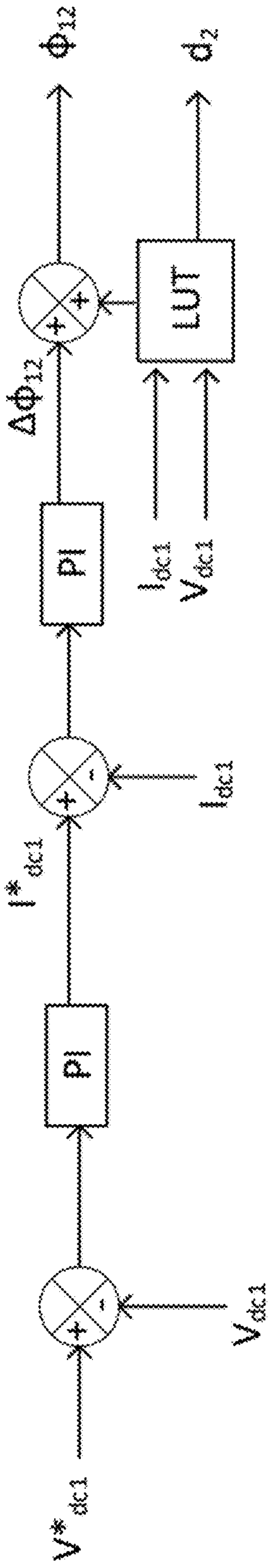
FIG. 10 is a schematic diagram of a control system for a first DC port according to one embodiment of the present invention.
Figure 11:
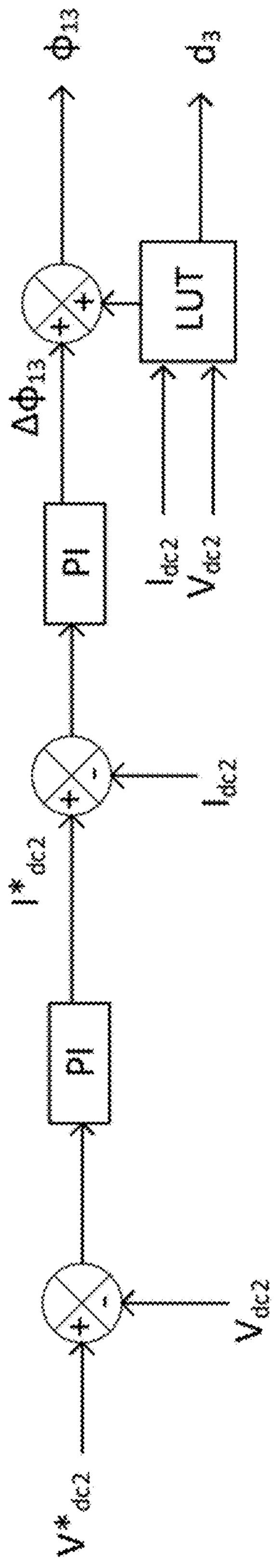
FIG. 11 is a schematic diagram of a control system for a second DC port according to one embodiment of the present invention.
Figure 12:
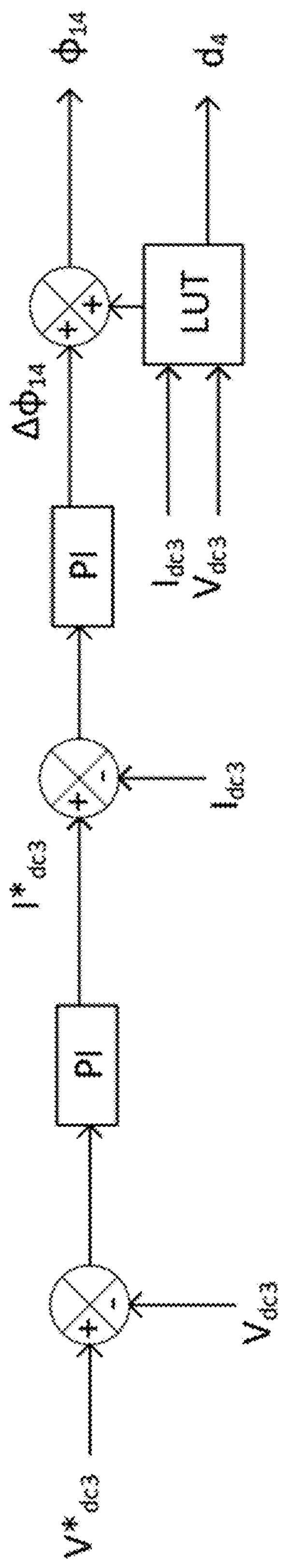
FIG. 12 is a schematic diagram of a control system for a third DC port according to one embodiment of the present invention.

FIGS. 10-12 are schematic diagrams of control systems for use with DC ports in the present invention. As shown in FIGS. 10-12, the voltage controls are able to operate independently for each port. In one embodiment, the power supply for each port is entirely decoupled as well. For each port, voltage regulation is able to be done using an outer voltage loop with a faster, inner current control loop. In one embodiment, the outer loop generates a current setpoint, while the inner loop is responsible for generating phase shift for the relevant port. In one embodiment, look-up tables (LUTs) are utilized to provide a feed-forward control of the ports. Given the input voltage and current parameters, the LUTs are able to be used to determine a port's phase and duty cycle. The use of sophisticated LUTs is also able to be used to provide power decoupling by feeding in all ports' current and voltage parameters. In one embodiment, the LUTs are used to optimize one or more of the following parameters for one or more ports: transformer root mean square (RMS) current, switch RMS current, zero-voltage switching for minimizing power losses, minimization of reactive power, and/or power-factor minimization.

Retail Location Implementation

The power router used in the present invention to connect to various power sources and loads allows for a significant reduction in the number of required components, providing for both a decreased cost of installation as well as a reduced physical footprint of the system, allowing it to be more practically used at smaller facilities, as well as more easily scaled to meet the needs of larger facilities. This reduced physical footprint allows for up to ten times higher power density than existing, prior art systems. For example, compared to a single analog transformer takes up a volume of approximately 655,480 $cm^3$ and 1180 kg, while the analogous digital transformer of the present invention takes up less than 115,000 $cm^3$ and only weighs approximately 90.7 kg, with a single port of the digital transformer occupying about 18,435 $cm^3$ and only weighing approximately 15 kg.

The present invention provides for a powertrain with greatly reduced intermediate components, thereby decreasing the footprint of necessary systems for managing a responsive microgrid with multiple sources and loads, and provides for increased efficiency as well. One important advantage of this system is it allows distributed energy resources (e.g., solar cells, batteries, etc.) to be onboarded or removed from the system without needing to be directly tied in with the grid power. Additionally, by providing a single system with control over each supply source providing power to the system, increased efficiency is gained due to a lack of need to communicate between different sources having different firmware from different manufacturers. By removing the delays of intercommunication between these components, switching is able to occur at frequencies of 40-100 kHz, meaning the system only requires microseconds to respond.

The speed at which the present invention is able to respond is important for microgrid environments. For example, in a retail embodiment, where a plurality of power sources (e.g., solar cells, batteries, etc.) are connected to retail utilities (e.g., lighting power, refrigeration, air conditioning, heating, etc.), specific retail devices (e.g., point-of-sale devices), electric vehicle chargers, and/or other types of devices, power draw is not even between each type of device, or over time, with periods of peak demand with much higher power draw being common. For example, near rush hour, increased usage of electric vehicle chargers often leads to peak demand requirements orders of magnitude higher than simply operating a nearby retail establishment, including retail utilities and specific retail devices. Another example is for data centers, where when graphics processing units (GPUs) need to go into "learning mode" to support development of a large language model (LLM) or another artificial intelligence (AI) model, peak demand rises quickly. Furthermore, this "learning mode" could easily be triggered as much as multiple times per second, meaning that the cycling between periods of very high and normal demand is able to occur at high frequencies, which existing systems are unable to respond to without simply involving the larger grid.

Without the ability to quickly organize and onboard particular sources, or reduce power to other, less critical loads, many existing systems simply resort to a grid bypass immediately, leading to both higher cost for the microgrid operator and to more strain on the overall grid. Part of the reason for this issue is the lack of transistors or other components of sufficient scale to "black start" devices, and part of the reason is the aforementioned communication delays between devices, which means that resorting to grid power is simply easier and less risky for existing systems.

The present invention is capable of being used for retail establishments, data centers, or other embodiments to prioritize particular loads, onboard new loads or sources, and generally provide more efficient allocation of energy to necessary end points, with decreased reliance on broader grid power.

Figure 13:
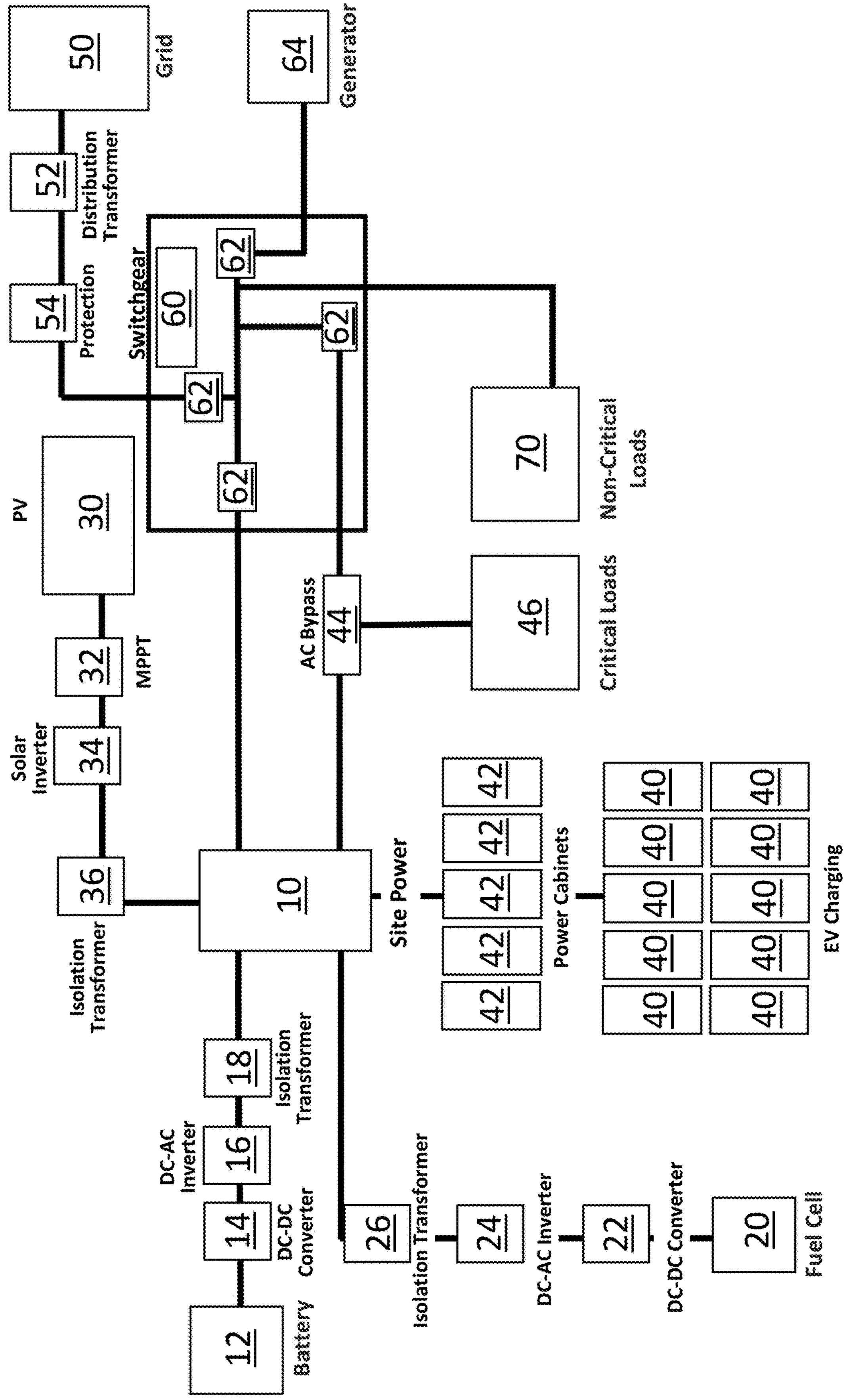
FIG. 13 is a schematic diagram of a system for a microgrid.

PRIOR ART FIG. 13 is a schematic diagram of a system for a microgrid. In order to demonstrate the improvements of the present invention relative to the prior art, an exemplary prior art system is known in FIG. 13. Prior art systems include a central site power 10 connected to various power sources. Such power sources are able to include one or more batteries 12 connected with a DC-DC converter 14, DC-AC inverter 16, and an isolation transformer 18 to the central site power 10. This orientation is repeated for other DC power sources, such that a fuel cell 20 is connected via a DC-DC converter 22, DC-AC inverter 24, and an isolation transformer 26 to the central site power. One or more photovoltaic power generators 30 are then connected via a maximum power point tracking (MPPT) 32 (analogous to a DC-DC converter), a solar inverter 34, and an isolation transformer 36 to the central site power. Finally, a plurality of EV charging stations 40 are able to be connected to the central site power 10 via a plurality of power cabinets 42.

Each of the components connecting the sources to the central site power 10 play an important role in prior art inventions for ensuring that the sources are able to integrate into the system. First, the DC-DC converter is able to boost the energy provided by the power source to the grid. The DC-AC inverters then allow for these DC power sources to converted to AC power such that they are compatible with the broader grid and isolation transformers provide galvanic isolation, which helps with various functions, including helping to isolate power sources to prevent damage in the event of surges and helping the power source be less volatile with fewer voltage fluctuations. On the other hand, EV charging stations 40 are connected to the central site power 10 by power cabinets 42, which hold necessary electronics for managing the power stations, such as circuit breakers.

The complications of these prior art systems are disadvantageous in several ways. First, the large number and size of components necessarily requires more space, money, and time for installation. Second, the system is made much less versatile, as it is not simple to substitute different power sources to connect to these DC-DC converters or other components, meaning changes to the types of sources or changes to the scale of the system require significant monetary and time investment, discouraging a dynamic approach to onboarding or offboarding particular energy sources.

A switchgear 60 in this system includes a plurality of circuit breakers 62 connected to the central site power 10, as well as a generator 64 and/or a grid connection 50. The grid 50 is able to be connected by a distribution transformer 52 and one or more protection devices 54. The combination of power connected to the switchgear 60 is then able to be used to power non-critical loads 70. If there is a power fault, some loads are able to be designated as critical loads 46, allowing the critical loads 46 to be directly connected to the central site power 10 via an AC bypass 44.

Figure 14:
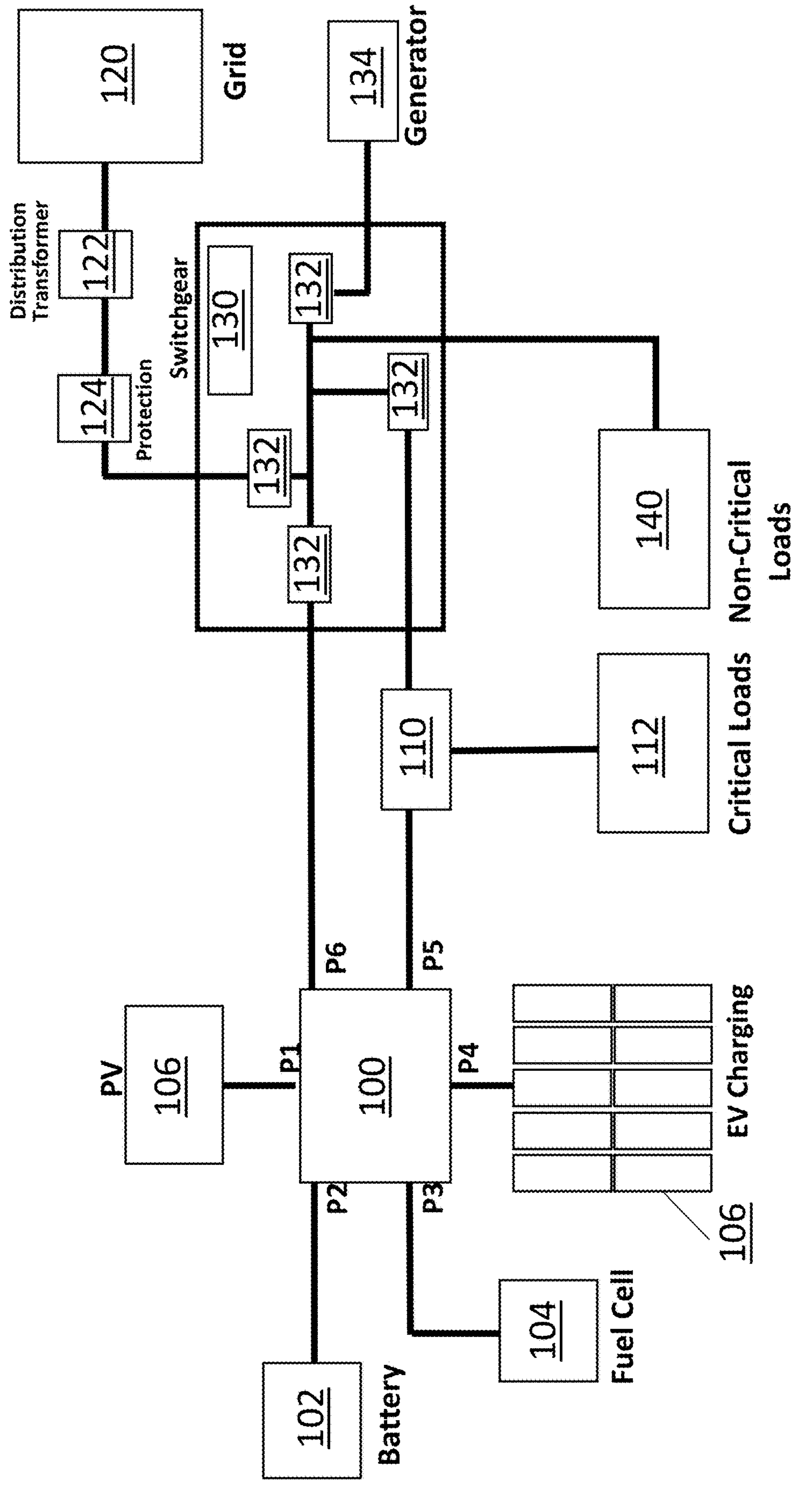
FIG. 14 is a schematic diagram of an improved system for a microgrid according to one embodiment of the present invention.

FIG. 14 is a schematic diagram of an improved system for a microgrid according to one embodiment of the present invention. The system of the present invention provides for direct connection of different power sources to a single unit, namely the power router 100. The power router 100 of the present invention provides a substantial improvement over the central site power 10 shown in FIG. 13. The power router 100 is able to connect to various energy sources, including both AC and DC ports for connection to, by way of example and not limitation, photovoltaic cells 106, batteries 102, and/or fuel cells 104, though one of ordinary skill in the art will understand that other energy sources, such as wind or water power sources are also able to be connected. This connection does not require separate isolation transformers, DC-DC converters, or DC-AC inverters, as the necessary functions of these components is performed within the power router 100, including galvanic isolation. One of ordinary skill in the art will understand that, while the power router 100 in FIG. 14 is drawn with six ports, power routers 100 having additional or reduced numbers of ports are also contemplated herein. The power router 100 is able to modularly add or drop ports at ease and is able to incorporate the technology discussed in U.S. patent application Ser. No. 18/627,004, filed Apr. 4, 2024, which is incorporated herein by reference in its entirety.

Other ports of the power router are able to directly connect to various loads, including electric vehicle (EV) charging stations 106. Unlike in the prior art system shown in FIG. 13, the system of the present invention includes direct connection of the EV charging stations 106 to the power router 100, as the power router 100. In general, loads, including non-critical loads 140 are connected directly to the power router 100 or connected via the circuit breakers 132 of the switchgear 130. In a preferred embodiment, the system includes an AC bypass 110 port able to directly connect the power router 100 to critical loads 112 in the event of failure of grid power 120, of the switchgear 130, or of other components of the system, thereby increasing the resiliency of the system to failures of individual components.

The ability to power many different load types allows the microgrid of the present invention to have a broad range of applications. For example, in a retail environment, the system is able to be used to both power EV charging stations in a parking lot of the retail store, as well power, for example, point-of-sale devices, lighting, refrigeration, or other devices within the store itself, allowing for a self-contained grid environment, but one which is still able to rely on grid power in emergency situations. However, the application is not limited to only retail applications and the invention is able to be used in a plurality of different settings, including but not limited to, hospitals, office buildings, gas stations, supermarkets, and/or other facilities.

Additional ports of the power router 100 are able to connect to a switchgear 130 including a plurality of circuit breakers 132 connected to a traditional generator 134 and/or a broader grid connection 120 via one or more distribution transformers 122 and one or more protection equipment 124. The power router 100 is able to dynamically draw power from or cut power from the grid 120 and/or the traditional generator 134 as necessary, such that, when sufficient amounts of power are able to be generated by the photovoltaic cells 106, for example, the system does not wastefully utilize the generator 134 or pay for grid power. Because the photovoltaic cells 106, or other renewable energy resources, passively generate power regardless of the actual load demands, when load demand is low, the power router 100 is able to dynamically allocate power to the batteries 102 in order to improve the ability of the microgrid to operate in an islanding mode for longer in the event of high power demand, without needing to rely on the broader grid 120.

The system is able to provide for prioritization between sources and/or between loads, with settings depending on needs of particular establishments or types of establishments. For example, the system is able to designate one or more particular critical loads as needing to never go down. In the event that the critical load is an AC load, the system is able to provide an AC bypass to grid power to ensure the critical load has power even in particularly high demand environments. In the event that the critical load is a DC load, the system is able to provide a DC bypass to a battery or generator to ensure that the critical load has power even in particular high demand environments.

In another embodiment, particular other loads are able to designated as droppable for a limited amount of time, such that the system will only cut power to those loads to prioritize power to other loads up to the limited amount of time, without exceeding it. For example, if air conditioning is designated as a non-critical load, but is only able to be dropped for a maximum of 20 minutes, then the system will not drop that load for longer than that period of time. Furthermore, the system is able to receive a minimum time until loads are able to be dropped again (e.g., air conditioning is only able to be dropped once per hour). In the event that temporary load drops of non-critical loads is insufficient to ensure sufficient power directed to critical loads, the grid bypass or DC bypasses to one or more backup batteries are able to be used as a last resort.

In order to inform prioritization, in one embodiment, the system utilizes one or more voltage, current, and/or impedance sensors, or reporting from specific power sources, to determine an amount of total power available and/or an amount of power available from each source. Similarly, such reporting from load devices, and/or sensor data from one or more voltage, current, and/or impedance sensors are able to be used to determine total energy demand and/or energy demand from one or more particular loads so as to inform the ability of the system to prioritize between different sources and/or loads. In one embodiment, the system receives measurements, such as maximum power (e.g., based on configuration of the port or via a dynamic impedance measurement) of each port and/or a transient impedance (e.g., based on minor voltage/current perturbations) of each port, at frequent intervals (e.g., multiple times per second, or even multiple times per millisecond).

In one embodiment, for a data center-specific situation, the system is able to receive notifications of initiation of learning modes or other high power-intensive processes for GPUs or other components of the data center. The system is operable to provide for DC bypass to one or more batteries, AC bypass to grid power, and/or onboard one or more additional sources at high frequencies (e.g., on a scale of microseconds) to ensure sufficient power is supplied as needed. In one embodiment, the system is operable to automatically cut power to one or more other loads and/or decrease power to one or more other loads responsive to these requests to ensure that sufficient power remains to be supplied to the GPUs or other power-intensive components. In one embodiment, the power prioritization is provided not only for the GPUs or other power-intensive components themselves, but also for other cooling systems necessary for ensuring thermal stability of the power-intensive components.

A further benefit of the present invention for microgrid applications is the ability to easily remove faulty or obsolete sources or loads, or to add new sources or loads without turning off the system. Because the system provides for galvanic isolation of each port, and each port is able to be easily disconnected from the system, ports are able to be manipulated, repaired, added, or dropped and physically removed without the need for downtime. Not only does this improve ease of operation, it also encourages adoption of new technologies, such as renewable energy, as establishments in need of constant uptime are able to add such energy resources without sacrificing crucial operation time.

Figure 15:
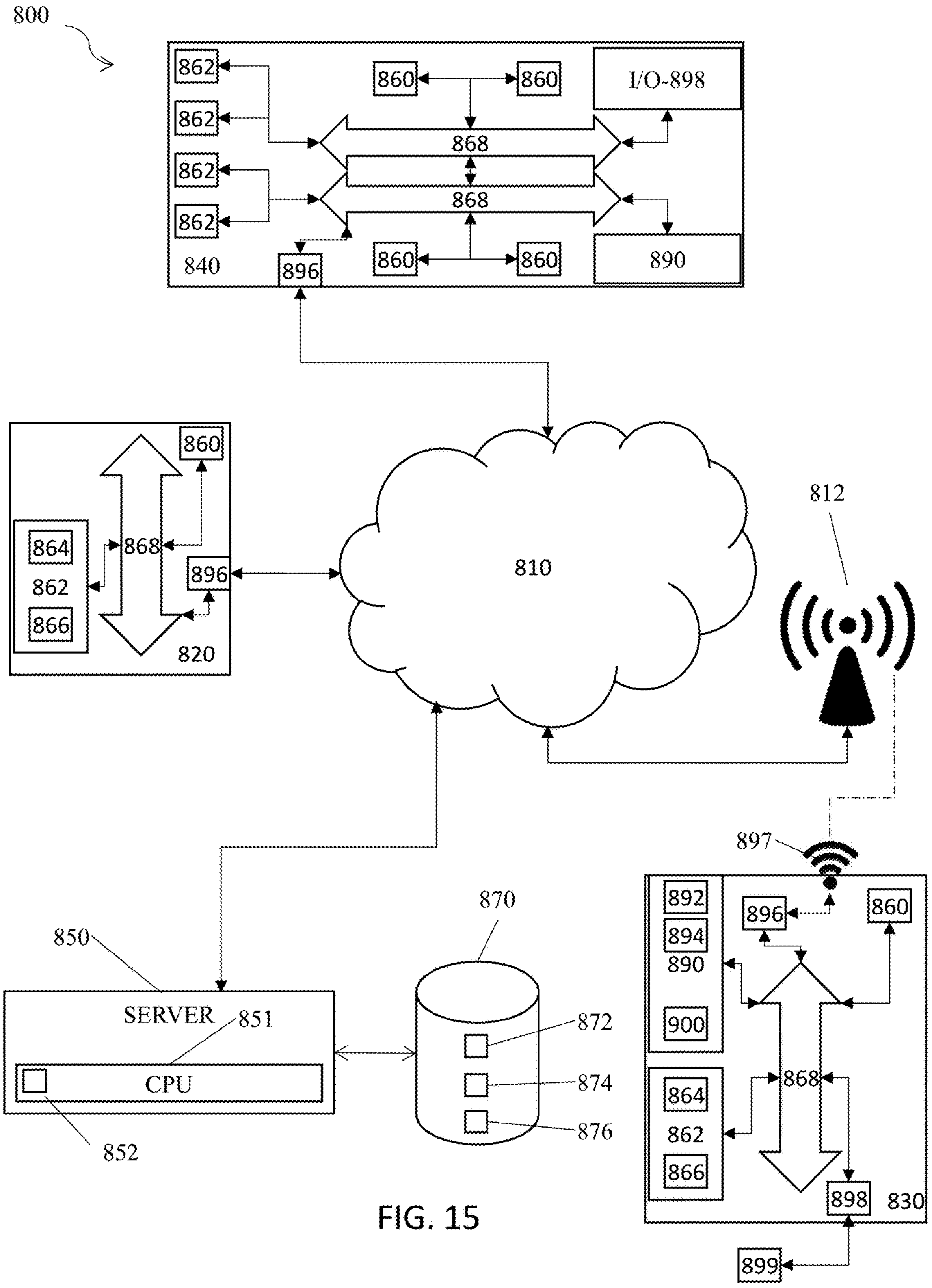
FIG. 15 is a schematic diagram of a system of the present invention.

FIG. 15 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 15, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable to be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 15, is operable to include other components that are not explicitly shown in FIG. 15, or is operable to utilize an architecture completely different than that shown in FIG. 15.

The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A microgrid system, comprising:

a power router, including a central transformer comprising a plurality of windings;

a grid connection connected to the power router via a first port, wherein the first port is connected to the central transformer via a first winding of the plurality of windings;

a plurality of loads connected to the power router via a plurality of load ports, wherein the plurality of load ports are individually connected to the central transformer via a plurality of corresponding load windings of the plurality of windings;

one or more batteries and/or one or more power generators connected to the power router via one or more source ports, wherein the one or more source ports are individually connected to the central transformer via one or more corresponding source windings of the plurality of windings; and a controller;

wherein the first port, a source port of the one or more source ports, and/or a load port of the plurality of load ports are configured for zero-voltage switching (ZVS) or zero-current switching (ZCS);

wherein the system is operable to measure at least one voltage and/or at least one current of the first port, at least one of the one or more source ports, and/or at least one of the plurality of load ports; and wherein the controller is operable to detect a fault of the first port, the at least one of the one or more source ports, and/or the at least one of the plurality of load ports based on the at least one measured voltage and/or the at least one measured current.

2. The system of claim 1, wherein, when the system determines insufficient power is available from the one or more source ports, the controller is operable to automatically utilize the grid connection.

3. The system of claim 1, wherein the one or more power generators include one or more solar cells.

4. The system of claim 1, wherein the plurality of loads includes at least one electric vehicle charging station.

5. The system of claim 1, wherein the system is operable to receive a designation of at least one of the plurality of loads as non-critical for a specified maximum amount of time, and wherein the controller does not cut power to the at least one of the plurality of loads for more than the specified maximum amount of time.

6. The system of claim 1, wherein the system is operable to perform transient impedance evaluation for the first port, the at least one of the plurality of load ports, and/or the at least one of the one or more source ports.

7. The system of claim 1, wherein each of the plurality of windings is galvanically isolated.

8. A method for operating a microgrid, comprising:

connecting a grid connection to a power router via a first port;

connecting a plurality of loads to the power router via a plurality of load ports;

connecting one or more batteries and/or one or more power generators to the power router via one or more source ports;

connecting the first port to a central transformer of the power router via a first winding of a plurality of windings of the central transformer;

connecting each of the plurality of load ports to the central transformer individually via a plurality of corresponding load windings of the plurality of windings;

connecting each of the one or more source ports to the central transformer individually via one or more corresponding source windings of the plurality of windings;

configuring the first port, a source port of the one or more source ports, and/or a load port of the plurality of load ports for zero-voltage switching (ZVS) or zero-current switching (ZCS);

measuring at least one voltage and/or at least one current of the first port, at least one of the one or more source ports, and/or at least one of the plurality of load ports; and detecting, via a controller, a fault of the first port, the at least one of the one or more source ports, and/or the at least one of the plurality of load ports based on the at least one measured voltage and/or the at least one measured current.

9. The method of claim 8, further comprising the controller automatically utilizing the grid connection when the controller determines insufficient power is available from the one or more source ports.

10. The method of claim 8, wherein the one or more power generators include one or more solar cells.

11. The method of claim 8, wherein the plurality of loads includes at least one electric vehicle charging station.

12. The method of claim 8, further comprising receiving a designation of at least one of the plurality of loads as non-critical for a specified maximum amount of time, and the controller being prevented from cutting power to the at least one of the plurality of loads for more than the specified maximum amount of time.

13. The method of claim 8, further comprising performing transient impedance evaluations for at least one of the plurality of windings.

14. The method of claim 8, wherein each of the plurality of windings is galvanically isolated.

15. A microgrid system, comprising:

a power router, including a central transformer comprising a plurality of windings;

a plurality of loads connected to the power router via a plurality of load ports, wherein the plurality of load ports are individually connected to the central transformer via a plurality of corresponding load windings of the plurality of windings;

one or more batteries connected to the power router via one or more battery ports, wherein the one or more batteries are individually connected to the central transformer via one or more corresponding battery windings of the plurality of windings;

one or more power generators connected to the power router via one or more generator ports, wherein the one or more power generators are individually connected to the central transformer via one or more corresponding generator windings of the plurality of windings; and a controller;

wherein a battery port of the one or more battery ports, a generator port of the one or more generator ports, and/or a load port of the plurality of load ports are configured for zero-voltage switching (ZVS) or zero-current switching (ZCS);

wherein the system is operable to detect an amount of power available from at least one of the one or more battery ports and the one or more generator ports and/or an amount of power demand from at least one of the plurality of load ports; and wherein the controller is operable to automatically reduce or cut power to one or more of the plurality of load ports based on the amount of power available and/or the amount of power demand.

16. The system of claim 15, wherein the system is operable to receive a designation of at least one of the plurality of loads as non-critical for a specified maximum amount of time, and wherein the controller does not cut power to the at least one of the plurality of loads for more than the specified maximum amount of time.

17. The system of claim 15, wherein the plurality of loads includes at least one electric vehicle charging station.

18. The system of claim 1, wherein the controller is operable to prioritize the first port, the at least one of the plurality of load ports, and/or the at least one of the one or more source ports based on an amount of power available from the at least one of the one or more source ports and/or an amount of power demand from the at least one of the plurality of load ports.

19. The method of claim 8, further comprising prioritizing, via the controller, the first port, the at least one of the plurality of load ports, and/or the at least one of the one or more source ports based on an amount of power available from the at least one of the one or more source ports and/or an amount of power demand from the at least one of the plurality of load ports.

20. The system of claim 15, wherein each of the plurality of windings is galvanically isolated.

* * * * *